US010307833B2

(12) United States Patent
Harif

(10) Patent No.: US 10,307,833 B2
(45) Date of Patent: Jun. 4, 2019

(54) CUTTING TOOL COMPRISING A CUTTING TOOL HOLDER AND A CUTTING INSERT THEREFOR

(71) Applicant: NO SCREW LTD., Holon (IL)

(72) Inventor: Gershon Harif, Ramat Gan (IL)

(73) Assignee: NO SCREW LTD., Holon (IL)

( * ) Notice: Subject to any disclaimer, the term of this patent is extended or adjusted under 35 U.S.C. 154(b) by 36 days.

(21) Appl. No.: 15/547,020

(22) PCT Filed: Feb. 4, 2015

(86) PCT No.: PCT/IL2015/050121
§ 371 (c)(1),
(2) Date: Jul. 27, 2017

(87) PCT Pub. No.: WO2016/125130
PCT Pub. Date: Aug. 11, 2016

(65) Prior Publication Data
US 2018/0015549 A1 Jan. 18, 2018

(51) Int. Cl.
B23B 27/16 (2006.01)
B23C 5/24 (2006.01)

(52) U.S. Cl.
CPC ...... B23B 27/1681 (2013.01); B23B 27/1662 (2013.01); B23B 2200/0471 (2013.01); B23B 2200/3618 (2013.01); B23B 2205/04 (2013.01); B23B 2205/12 (2013.01); B23C 5/2472 (2013.01)

(58) Field of Classification Search
CPC ............ B23B 27/1681; B23B 27/1662; B23B 2205/045; B23B 2205/04; B23B 2205/12; B23C 2210/165
See application file for complete search history.

(56) References Cited

U.S. PATENT DOCUMENTS

| 3,027,623 A | 4/1962 | Severson et al. |
| 3,138,846 A | 6/1964 | Conti et al. |
| 3,299,489 A | 1/1967 | Kurt |
| 3,341,919 A | 9/1967 | Lovendahl et al. |
| 3,341,921 A | 9/1967 | Weller et al. |

(Continued)

FOREIGN PATENT DOCUMENTS

| AT | 6206 U1 | 6/2003 |
| CN | 1368416 A | 9/2002 |

(Continued)

OTHER PUBLICATIONS

English translation of DE 2443756, Apr. 1976 (Year: 1976).*

(Continued)

Primary Examiner — Alan Snyder
(74) Attorney, Agent, or Firm — Dorsey & Whitney LLP

(57) ABSTRACT

A cutting tool holder (110) configured for mounting thereon a cutting insert (140'). The cutting tool holder comprises a body (112) formed with an insert seat (120) configured receiving therein the cutting insert and a seat bore (135) configured for accommodating therein a fastening member (150'). The cutting tool holder also comprises an anchoring element (170) received within the body of the holder, the fastening element being configured for secured engagement with the anchoring element and being free of such engagement with the seat bore.

18 Claims, 14 Drawing Sheets

(56) References Cited

U.S. PATENT DOCUMENTS

| | | |
|---|---|---|
| 3,341,923 A | 9/1967 | Kelm |
| 3,491,421 A | 1/1970 | Holloway |
| 3,648,341 A | 3/1972 | Viellet et al. |
| 3,740,807 A | 6/1973 | Getts et al. |
| 3,747,179 A | 7/1973 | Lovendahl |
| 3,787,941 A | 1/1974 | Novkov |
| 3,805,351 A | 4/1974 | Mayer et al. |
| 3,913,197 A | 10/1975 | Wolf et al. |
| 3,925,868 A | 12/1975 | Singh et al. |
| 3,946,473 A | 3/1976 | Petersen et al. |
| 4,035,887 A | 7/1977 | Hertel et al. |
| 4,044,440 A | 8/1977 | Stier et al. |
| 4,204,781 A | 5/1980 | Johann |
| 4,283,163 A | 8/1981 | Graefe et al. |
| 4,397,592 A | 8/1983 | Erickson et al. |
| 4,398,853 A | 8/1983 | Erickson |
| 4,507,023 A | 3/1985 | Shikata et al. |
| 4,527,930 A | 7/1985 | Harroun et al. |
| 4,621,957 A | 11/1986 | Dillard et al. |
| 4,869,624 A | 9/1989 | Viellet |
| 5,167,473 A | 12/1992 | Barnett |
| 5,199,828 A | 4/1993 | Jansson; et al. |
| 5,836,724 A | 11/1998 | Satran et al. |
| 5,938,377 A | 8/1999 | Jordberg et al. |
| 6,155,754 A | 12/2000 | Joensson et al. |
| 6,158,928 A | 12/2000 | Hecht et al. |
| 6,168,356 B1 | 1/2001 | Hansson et al. |
| 6,579,042 B1 | 6/2003 | Shiraiwa |
| 7,144,205 B2 | 12/2006 | Sheffler et al. |
| 7,261,495 B1 | 8/2007 | Nelson et al. |
| 7,264,424 B2 | 9/2007 | Berminge et al. |
| 7,273,331 B2 | 9/2007 | Giannetti et al. |
| 7,677,842 B2 | 3/2010 | Park |
| 7,775,750 B2 | 8/2010 | Satran et al. |
| 7,780,380 B2 | 8/2010 | Watanabe et al. |
| 8,568,064 B2 | 10/2013 | Carl |
| 8,821,079 B2 | 9/2014 | Hecht |
| 8,870,499 B2 | 10/2014 | Harif |
| 8,882,404 B2 | 11/2014 | Harif |
| 9,120,154 B2 | 9/2015 | Hen et al. |
| 2003/0031519 A1 | 2/2003 | Hecht |
| 2005/0152754 A1 | 7/2005 | Wiman et al. |
| 2007/0003384 A1 | 1/2007 | Ballas et al. |
| 2008/0166191 A1 | 7/2008 | Andersson et al. |
| 2008/0193233 A1 | 8/2008 | Park et al. |
| 2009/0092451 A1 | 4/2009 | Harif et al. |
| 2009/0238651 A1 | 9/2009 | Nguyen |
| 2010/0272522 A1 | 10/2010 | Hecht |
| 2011/0305532 A1 | 12/2011 | Harif et al. |
| 2012/0082521 A1 | 4/2012 | Burtscher et al. |
| 2012/0170988 A1 | 7/2012 | Kountanya et al. |
| 2013/0004252 A1 | 1/2013 | Yoshioka |
| 2013/0051938 A1 | 2/2013 | Tulchinsky et al. |

FOREIGN PATENT DOCUMENTS

| | | | |
|---|---|---|---|
| CN | 1623725 A | 6/2005 | |
| CN | 101028654 A | 9/2007 | |
| CN | 102781613 A | 11/2012 | |
| DE | 1260926 B | 2/1968 | |
| DE | 2443756 A1 * | 4/1976 | ............ B23B 27/08 |
| DE | 2853313 A1 | 6/1980 | |
| DE | 3301191 A1 | 7/1984 | |
| EP | 1764 A1 | 5/1979 | |
| EP | 0037554 A1 | 10/1981 | |
| EP | 0179033 A2 | 4/1986 | |
| EP | 0300172 | 1/1989 | |
| EP | 402854 A2 | 12/1990 | |
| EP | 0487478 A1 | 5/1992 | |
| EP | 0730926 A1 | 9/1996 | |
| EP | 2487001 A2 | 8/2012 | |
| EP | 2614907 A1 | 7/2013 | |
| GB | 1011658 A | 12/1965 | |
| GB | 1527091 A | 10/1978 | |
| GB | 1584237 A | 2/1981 | |
| GB | 2057940 A | 4/1981 | |
| GB | 2098105 A | 11/1982 | |
| JP | S4844661 B1 | 12/1973 | |
| JP | S5431690 B1 | 3/1979 | |
| JP | 57189718 A * | 11/1982 | ............... B23C 5/08 |
| JP | Hei1-132319 | 9/1989 | |
| JP | H03281115 A | 12/1991 | |
| JP | 9108909 | 4/1997 | |
| JP | H09234608 A | 9/1997 | |
| JP | 98/30349 | 7/1998 | |
| JP | 2001507287 A | 6/2001 | |
| JP | 2004521767 A | 7/2004 | |
| JP | 2008520447 A | 6/2008 | |
| JP | 2010507496 A | 3/2010 | |
| SE | 463703 B | 1/1991 | |
| SE | 502241 A | 9/1995 | |
| SU | 665993 A1 | 6/1979 | |
| SU | 703248 A1 | 12/1979 | |
| SU | 709261 A1 | 1/1980 | |
| SU | 831394 A1 | 5/1981 | |
| SU | 848158 A1 | 7/1981 | |
| SU | 1079370 A1 | 3/1984 | |
| WO | 1993/17822 | 9/1993 | |
| WO | 1996/26802 | 9/1996 | |
| WO | WO98/30349 | 7/1998 | |
| WO | 99/54078 | 10/1999 | |
| WO | 2003004204 | 1/2003 | |
| WO | 03/022495 | 3/2003 | |
| WO | 03/101653 | 12/2003 | |
| WO | WO 2007/067138 A1 | 6/2007 | |
| WO | 2007/098043 | 8/2007 | |
| WO | 2007/134930 | 11/2007 | |
| WO | 2008114242 A1 | 9/2008 | |
| WO | 2008/149371 | 12/2008 | |
| WO | 2009028747 A1 | 3/2009 | |
| WO | 2015033338 A2 | 3/2015 | |

OTHER PUBLICATIONS

International Search Report and Written Opinion from International Application No. PCT/IL2010/000162 dated Jun. 30, 2010.

"XP-002587912 Abstract, WPI Week 198537", Thomson Scientific, Jan. 8, 1984.

* cited by examiner

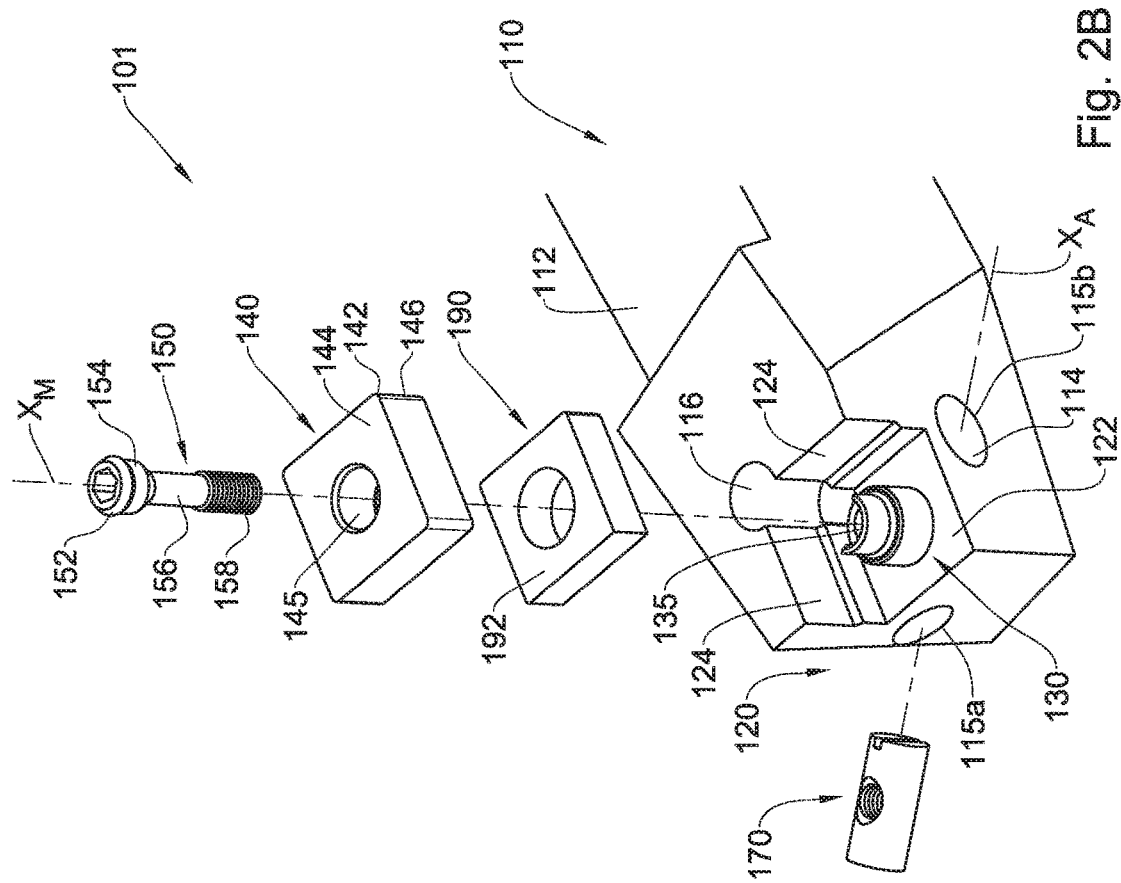
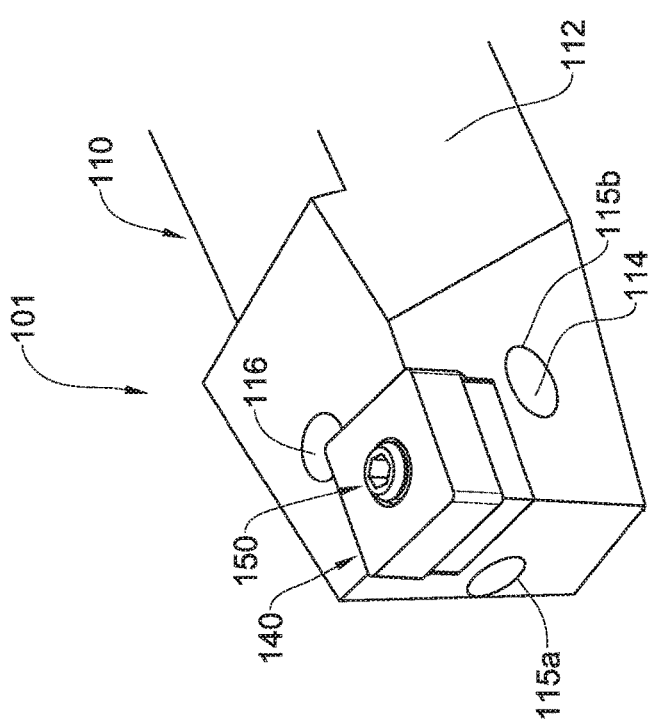

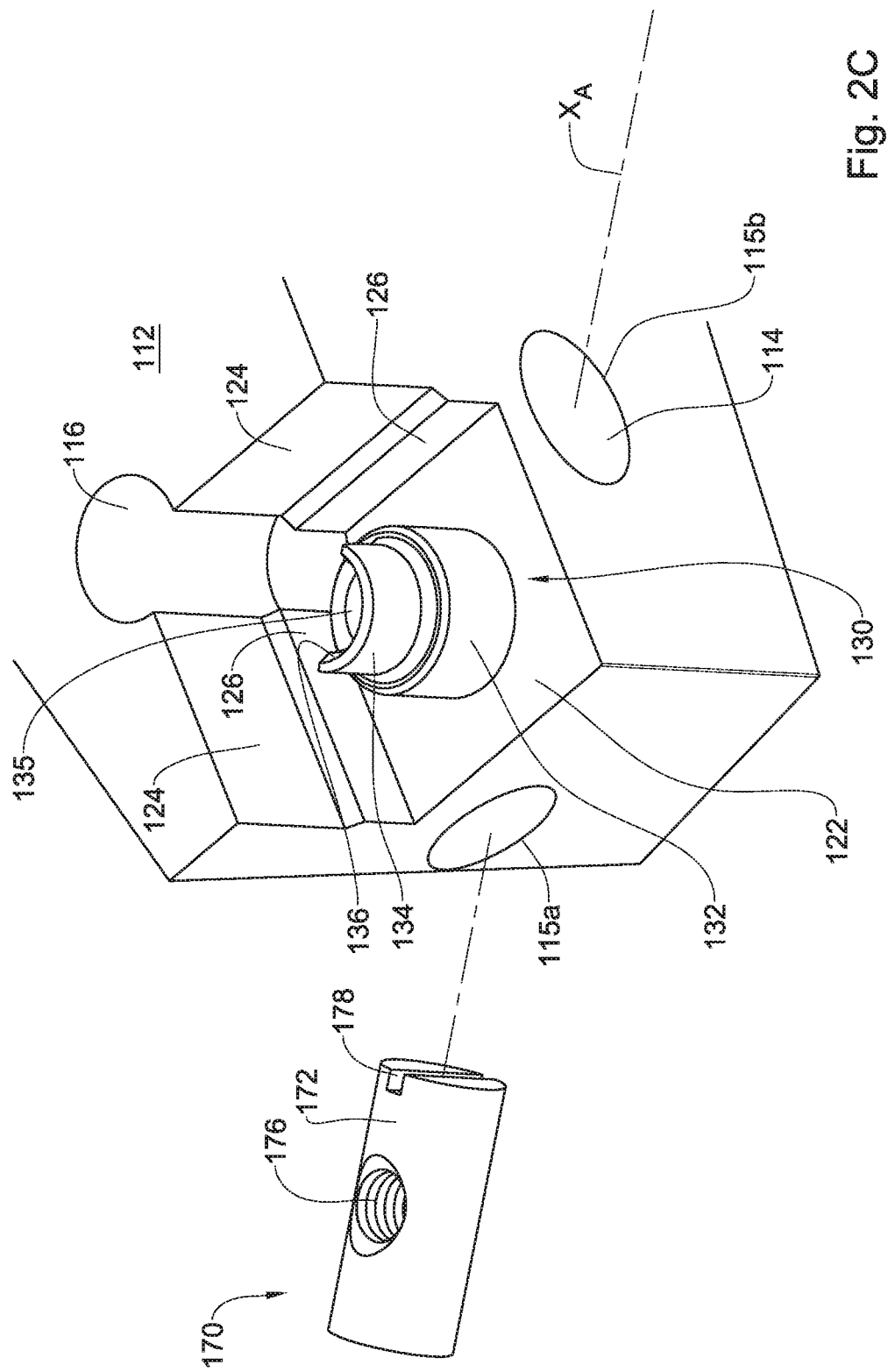

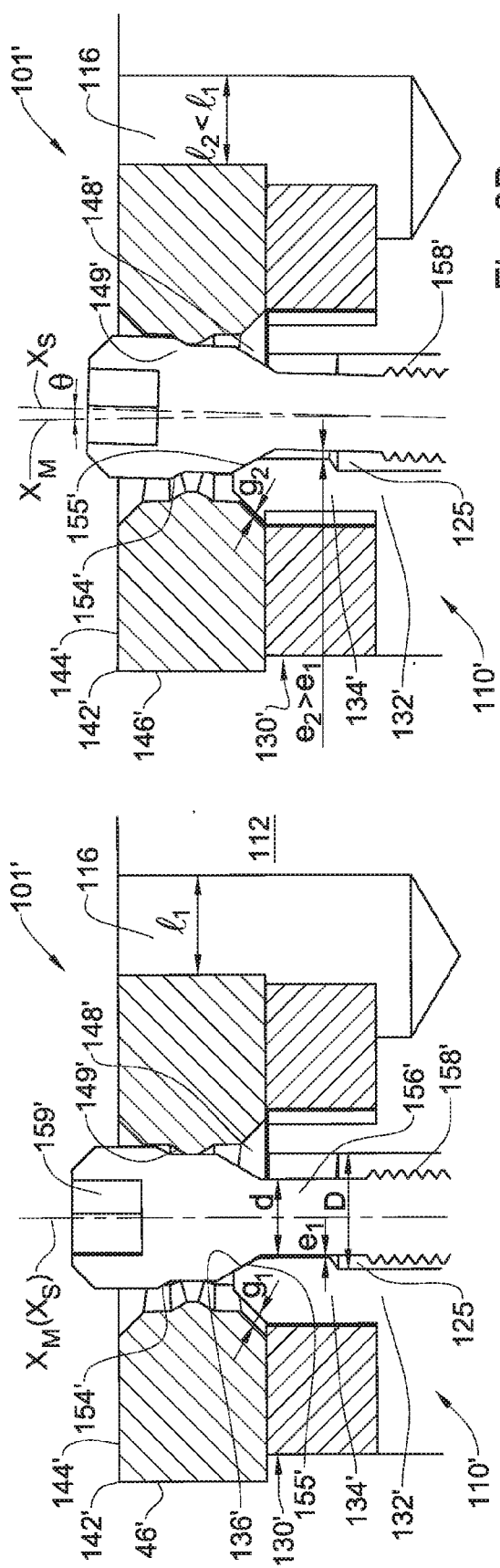
Fig. 8B
Fig. 8A
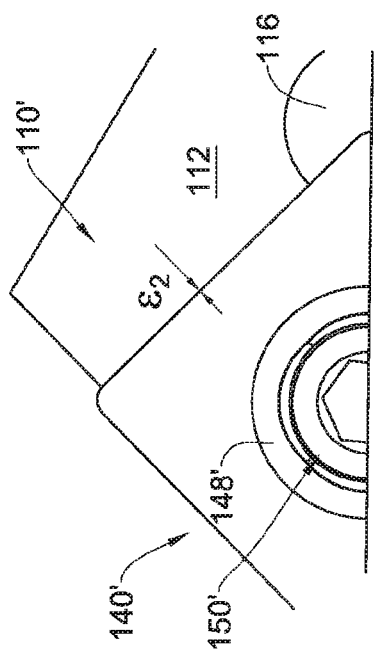
Fig. 8D
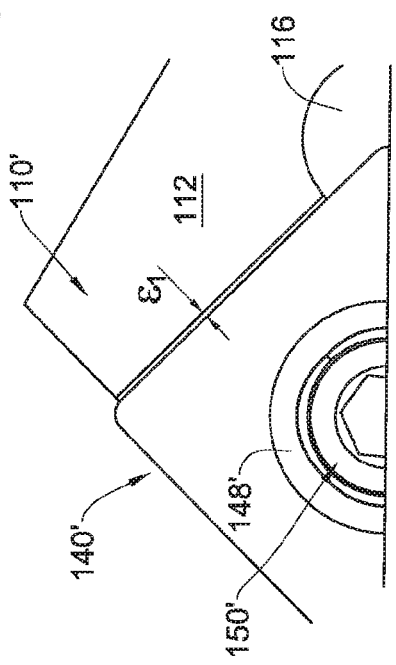
Fig. 8C

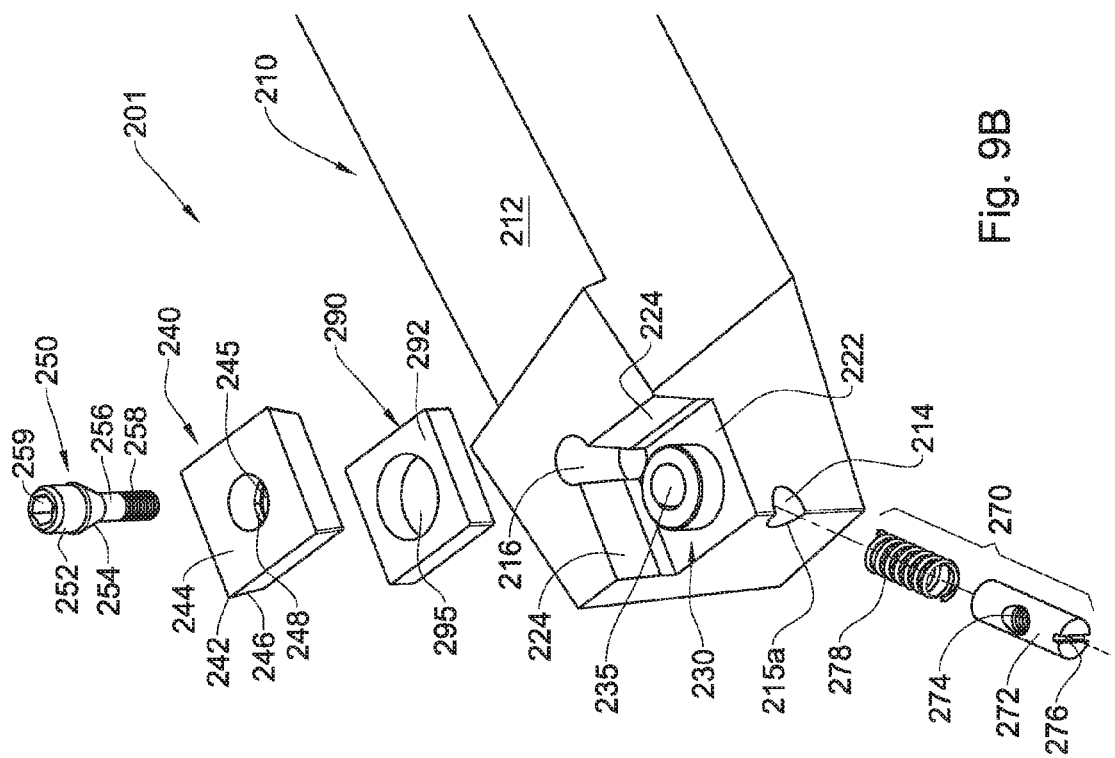
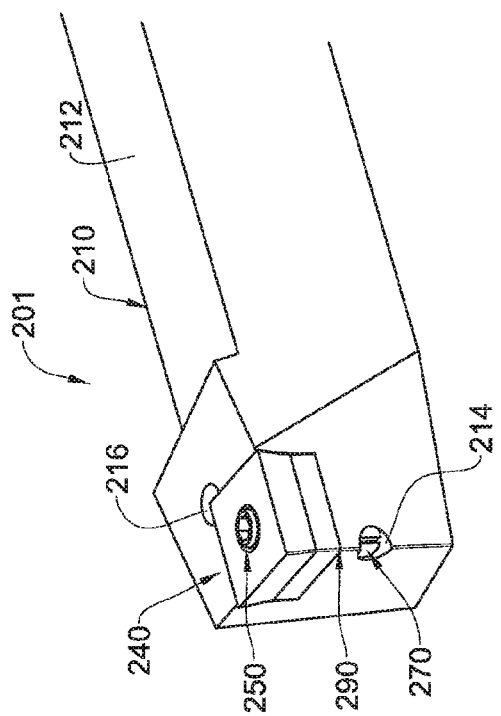
Fig. 9A
Fig. 9B

CUTTING TOOL COMPRISING A CUTTING TOOL HOLDER AND A CUTTING INSERT THEREFOR

TECHNOLOGICAL FIELD

The subject matter of the present application is in the field of cutting tools, in particular, in the field of mounting and securing mechanisms of cutting inserts onto cutting tool holders.

BACKGROUND ART

A cutting tool is generally formed with at least one cutting edge, and is adapted for the removal of material from a workpiece by bringing the cutting edge into contact with the workpiece and displacing the cutting edge with respect to the workpiece either by displacing the cutting tool with respect to the workpiece or vise versa.

The cutting edges of cutting tools wear rapidly when used for cutting operations, particularly when cutting hard materials such as metal, and therefore they must be frequently replaced or re-sharpened. In many types of cutting tools, such as tools adapted for milling/drilling/turning machines, the cutting tool may comprise a plurality of cutting inserts, each being formed with at least one cutting edge, the inserts being fixed within seats of a cutting tool holder to form the cutting tool.

In a conventional cutting tool, the cutting insert is attached within the seat of the cutting tool by a fastener passing through a bore in the cutting insert into the bottom of the seat of the cutting tool. Indexing (or completely replacing) the cutting insert to enable the use of another cutting edge (or another insert altogether) requires the removal of the fastener, the reorientation or removal of the cutting insert, and the reattachment of the cutting insert within the seat of the cutting tool by the fastener. Each of these operations involves time and labor, and since cutting tools generally include a plurality of such cutting inserts, the time and labor costs involved in indexing the cutting inserts in a cutting tool are considerable.

In order to overcome technical problems, among which is the one presented above, alternative methods of mounting the cutting inserts onto the cutting tool holder have been devised as disclosed in WO2008/149371 to the applicant.

Other methods of fastening cutting inserts onto cutting tool holders include the use of clamps and lever mechanisms which are usually in the form of a mechanic assembly comprising at least one moving part configured for displacing so as to come into contact with a designated surface of the cutting insert and applying pressure thereto for the purpose of securing it. Examples of such arrangement are disclosed in U.S. Pat. Nos. 3,027,623A, 3,138,846A and others.

Additional examples include EP0037554, U.S. Pat. No. 3,341,919, 3,805,351, 3,913,197, 3,946,473 and 5,199,828, disclosing arrangements in which the fastening screw remains engaged with the tool holder during mounting/dismounting of the cutting insert.

Acknowledgement of the above references herein is not to be inferred as meaning that these are in any way relevant to the patentability of the presently disclosed subject matter.

GENERAL DESCRIPTION

The subject matter of the present application calls for a cutting tool holder configured for mounting thereon a cutting insert, said cutting tool holder comprising a body formed with a seat and a seat bore configured for accommodating therein a fastening member, and wherein said holder also comprises an anchoring element received within the body of the holder, said fastening element being configured for secured engagement with said anchoring element and being free of such engagement with the seat bore.

According to one aspect of the subject matter of the present application there is provided a cutting tool holder configured for mounting thereon a cutting insert, said cutting tool holder comprising:

a body formed with a seat configured for receiving therein the cutting insert, and having a base surface;

a seat bore extending within the body along a bore axis, and having an open end at said base surface;

an anchoring bore extending within the body along an anchoring axis oriented transverse to said bore axis, and intersecting with said seat bore to have a mutual intersection zone;

a securing arrangement comprising:

a fastening member having a proximal end and a distal end and configured for being received within the seat bore but disengaged therefrom, said distal end being configured for securing the cutting insert into said insert seat;

an anchoring element received within said anchoring bore and configured for being articulated to the proximal end of said fastening member at the mutual intersection zone, when the latter is received within said seat bore;

wherein articulation between the fastening member and the anchoring element allows the fastening member to freely displace within said seat bore into a secured state in which the distal end secures said cutting insert into the insert seat.

The anchoring element can be separate and detachable from the body of the holder. In particular, the anchoring element can be replaceable, for example, in case it is worn or damaged. In addition, the anchoring bore can have at least one open end and the position and/or orientation of the anchoring element with respect to the anchoring bore can be adjusted via said open end using a designated tool.

In all of the embodiments of the present application, the body of the fastening member (also referred herein a the 'shaft', 'shank', 'stud' etc.) is configured for freely displacing within said seat bore without engaging it. It is appreciated that the term 'engagement' should be interpreted as a mechanical coupling between to components. In that sense, a fastening member snugly fitted yet freely sliding/displacing within the seat bore is not considered as 'engaged' with the seat bore under the present application.

In addition, the fastening member can also be received within the seat bore in a loosely displaceable manner, providing the fastening member with a certain degree of freedom allowing lateral displacement thereof with respect to the seat bore in a direction transverse to the bore axis.

Specifically, in any cross-section including both said fastening member and the seat bore, and taken along a plane perpendicular to a longitudinal axis of the fastening member (extending between its distal and proximal end), the cross-sectional area of the fastening member is smaller than the cross-sectional area of the seat bore. In particular, in such a cross-section there exists a space between a cross-sectional contour of the fastening member and a cross-section contour of the seat bore. Under this arrangement, when a segment of the cross-sectional contour of the fastening member coincides with a segment of the cross-sectional contour of the seat bore, the cross-sectional shape of the fastening member is inevitably disposed asymmetrically with respect to the cross-sectional area of the seat bore.

In accordance with a particular example, the fastening member can have a circular cross-section of a diameter d, and the seat bore can have a cross-sectional size and shape which are at least sufficient for fully containing therein the cross-section of the fastening member. For a cross-sectional area of the seat bore which is circularly symmetrical, the nominal dimension D of its inscribed circle can be such that D>d. For a cross-sectional area of the seat bore which is not circularly symmetrical, the nominal dimension D' of its widest extension can be such that D'>d.

The fastening member can be configured for assuming a mounting state within said seat bore in which a cutting insert can be placed in the insert seat and a secured state in which the cutting insert is secured within the seat.

Displacement between the mounting state and secured state can be by way of axial displacement, lateral displacement, rotation, or any combination of the three. Furthermore, for each of these displacements, the distal end of the fastening member can be configured for applying, on the cutting insert, axial pressure to press it against the base surface, lateral pressure to press it against a side wall of the seat transverse to the base surface or a combination of the two.

The distal end of the fastening member can comprise a head portion configured for engaging a designated portion of the cutting insert, a designated portion of the cutting tool holder or both to provide proper securing of the cutting insert into the insert seat in the secured state.

According to different examples, the fastening member can be configured for performing different types of movement into/along/within the seat bore, as specified below.

Axial Movement

Under this design embodiment, the displacement of the fastening member is axial, and the anchoring element can be configured for maintaining a substantially fixed orientation within the anchoring bore during displacement of the fastening member. Thus, in comparison with a standard cutting tool holder, the anchoring element functionally replaces that integral portion of the seat bore with which the proximal end of the fastening member would naturally engage, by comprising a feature previously integrally formed with the body of the tool holder.

In particular, the anchoring element can comprise a threaded bore, replacing the seat bore, and configured for threadingly receiving therein the threaded proximal end of the fastening member.

According to this design embodiment, the fastening member is only configured for axial displacement and the head portion thereof is configured for engaging the cutting insert to press it down towards the base surface.

It is appreciated that since the fastening member only performs axial displacement and only comes into contact with the cutting insert to press downward on it (clamping it against the base surface), there are substantially no forces transmitted to the anchoring element which cause axial displacement thereof along the anchoring bore or rotational movement about the anchoring axis.

Thus, the anchoring bore can assume essentially any orientation with respect to the seat bore, provided that displacement of the fastening member does not entail displacement of the anchoring element along the axis of the seat bore. In other words, it is required that the anchoring element is arrested, at least at some point during the operation, in order to yield displacement of the fastening member. In this essence, in the downward axial movement design embodiment, the anchoring element serves as a nut for the proximal end of the fastening member.

This configuration can be considered similar to a bolt and nut attachment, in which the fastening member takes on the role of the bolt and the anchoring member takes on the role of the nut. However, it is appreciated that the articulation between the proximal end of the fastening member and the anchoring element is not restricted to a threaded one (as in a bolt and a nut), and can be constituted by a variety of articulation methods.

Lateral Movement

Under this design embodiment, the fastening member does not axially displace within the seat bore but either laterally displaces and/or pivots therein. More specifically, the axial position (but not necessarily orientation) of the fastening member does not change with respect to the anchoring element, and even more specifically, the proximal end of the fastening member does not displace with respect to the anchoring element, at least not axially.

According to this design embodiment, the head portion of the fastening member is configured for any one of the following two operations and/or a combination thereof:

abutting an inner or side surface of the cutting insert in order to apply lateral pressure thereon entailing displacement of the cutting insert towards the side wall of the insert seat and/or its securing with respect thereto; and abutting a surface of the cutting insert in order to press downward on it, clamping it against the base surface.

According to one example, the head portion of the fastening member is asymmetrically shaped around an axis of the fastening member, and the seat bore is formed with a support portion opposite the side wall and adjacent said head portion, in which case revolution of the fastening member about its axis causes lateral displacement of the head portion of the fastening member towards the side wall as a result of its engagement with the support portion.

The anchoring bore can be oriented transverse to both the seat bore and the movement direction of the head portion of the fastening member, whereby displacement of the head portion towards the side wall entails revolution/rotation of the anchoring element within the anchoring bore about the anchoring bore's axis.

Under this example, as the fastening member revolved within the seat bore, it also performs a pivotal movement about a pivot point located at the engagement point between the proximal end of the fastening member and the anchoring element. In this case, the orientation of the fastening member changes between the mounting state and the secured state.

Alternatively, the anchoring bore can be oriented transverse to the seat bore and along the movement direction of the head portion of the fastening member, whereby displacement of the head portion towards the side wall entails axial displacement of the anchoring element within the anchoring bore along the anchoring bore's axis.

Under this example, as the fastening member revolves within the seat bore, it performs a lateral displacement along the axis of the anchoring bore. In this case, contrary to the previous example, the fastening member maintains as similar orientation in both the mounting and the secured states.

Specifically, the proximal end of the fastening member can be received within the anchoring element in a pure rotational manner, which does not necessarily entail axial displacement of the fastening member with respect to the anchoring element.

Combined Axial and Lateral Movement

Under this design embodiment, the fastening member can be configured for axial displacement along the seat bore and with respect to the anchoring element, and can comprise a head portion configured for abutting a corresponding support portion of the seat bore, located opposite the side wall.

The arrangement can be such that the orientation of the head portion and the support portion are such that, during abutment between the head portion and the support surface, axial displacement of the fastening member along the seat bore yields lateral displacement of the head portion thereof owing to the said abutment.

Any of the following combinations can be applied:
- the head portion has a surface which is inclined with respect to the axis of the fastening member and the support portion has a surface which is parallel to the bore axis;
- the head portion has a surface parallel to the axis of the fastening member and the support portion has a surface which is inclined with respect to the bore axis; and
- the head portion has a surface which is inclined with respect to the axis of the fastening member and the support portion has a surface which is also inclined with respect to the bore axis.

In both previous example, i.e. lateral displacement and combined movement, as the fastening member displaces, for example, downwards into the seat bore, the engagement between the head portion and the support portion pushes the former towards the side wall. It is appreciated that were it not for the available movement/rotation of the anchoring element, the fastening member would be simply arrested within the seat bore due to the above abutment. However, since the proximal end of the fastening member is articulated to the anchoring element, and the latter can displace/rotate, the fastening member is free to continue its displacement into the seat bore, though under a change in its axial/lateral/orientational position.

In order to allow the fastening member the required space to perform the above mentioned displacement, the seat bore can be designed to have a diameter and/or nominal dimension (in case it is not of a circular cross-section) which is generally larger than that of the fastening member. In other words, in a cross-section of the cutting tool holder, at any position thereof, there exists a gap between the cross-section of the fastening member and the boundary of the seat bore.

It is appreciated that while the axial displacement of the fastening member with respect to the anchoring element does not entail any displacement of the latter, the lateral movement of the head portion towards/away from the side wall does entail such displacement/rotation of the anchoring element.

According to one example, the anchoring bore is oriented transverse to both the seat bore and the movement direction of the head portion of the fastening member, whereby displacement of the head portion towards the side wall entails revolution/rotation of the anchoring element within the anchoring bore about the anchoring bore's axis.

Under this example, as the fastening member displaces axially into the seat bore, it performs a combined movement in which the head portion thereof displaces both axially downwards along the bore axis and rotates with a pivot point at the engagement point between it and the anchoring element. In this case, the orientation of the fastening member changes between the mounting state and the secured state.

According to another example, the anchoring bore is oriented transverse to the seat bore and along the movement direction of the head portion of the fastening member, whereby displacement of the head portion towards the side wall entails axial displacement of the anchoring element within the anchoring bore along the anchoring bore's axis.

Under this example, as the fastening member displaces into the seat bore, it performs a combined movement in which the head portion thereof displaces both axially downwards along the seat bore and laterally along the axis of the anchoring bore. In this case, contrary to the previous example, the fastening member maintains as similar orientation in both the mounting and the secured states.

In connection with the above, the cutting tool holder can be such that the fastening member is configured for displacing with respect to the seat bore between a mounting state in which the distal end of the fastening member protrudes from the base surface to a first axial extent and is disposed at a first gap distance from the side wall, and a secured state in which said distal end protrudes from said base surface to a second axial extent, different than the first axial extent and is disposed at a second gap distance from the side wall, smaller than the first gap distance, so as to engage the inner surface of said insert bore, thereby securing said insert between the head portion and the at least one side wall.

Respective to the above mounting and secured state, owing to engagement between the head portion of the fastening member and the support portion of the insert seat, axial displacement of the fastening member between the mounting state and the secured state entails a respective displacement of the anchoring element, so that in the mounting state said anchoring element is in a first anchoring position with respect to said anchoring bore, and in said secured state, said anchoring element is in a second anchoring position with respect to said anchoring bore, different than the first anchoring position.

In accordance with a particular example, in the mounting state the first gap distance is such that allows said cutting insert to be placed onto the seat and/or being fully removed from the seat over the head portion of the fastening member.

In accordance with another aspect of the subject matter of the present application, there is provided a cutting tool comprising a cutting insert mounted onto a cutting tool holder according to the previous aspect of the subject matter of the present application.

In accordance with still another aspect of the subject matter of the present application there is provided a cutting insert configured for mounting onto a cutting tool holder to form a cutting tool, said cutting insert comprising an insert bore defining an insert axis and having two or more abutment surfaces configured for coming into contact with a fastening member of the cutting tool holder, wherein, in any cross-section taken along a plane perpendicular to the insert axis and through the two or more abutment surfaces, they define together the majority of a closed contour of the insert bore, each of the two or more abutment surfaces extends between a narrow edge having a first curvature radius and a wide end having a second curvature radius greater than the first curvature radius, and wherein at least the wide edge of at least one of the two or more abutment surfaces has its curvature center disposed between the wide edge and the insert axis.

In particular, in any cross-section taken along a plane perpendicular to the insert axis and passing through said two or more abutment surfaces, each of the abutment surfaces can have a contour edge. The arrangement can be such that in each such cross-sections (excluding a cross-section passing through a plane of the narrow edge), the center of curvature of the contour edge of at least one of the two or more abutment surfaces lies between the insert axis and the contour edge.

The wide edges of the abutment surfaces can be spaced from the top/bottom faces of the cutting insert, giving rise to a first bridging surface extending between the wide edges and the respective top/bottom face. Thus, the diameter of the insert bore at the first bridging surface is always greater or equal to the diameter of the insert bore at the wide edges.

According to a specific design, the two or more abutment surfaces form together a closed surface of the insert bore. In other words, the two or more abutment surfaces are directly consecutive with one another. Thus, in each such cross-section, the edge contours of the two or more abutment surfaces form together a closed contour.

In accordance with one example, each of the abutment surfaces can be constituted by a conical surface extending between a wide arc constituting the wide edge of the abutment surface and a narrow arc constituting the narrow edge of the abutment surface. The wide arc can have a curvature radius R and the narrow arc can have a curvature radius $r<R$.

In a cross-section of the cutting insert taken along a plane perpendicular to the insert axis and lying on the wide arc, the curvature radius R can be smaller than the curvature radius of a circle inscribing said closed contour, whereby the centers of curvature of the wide arcs do not coincide with the insert axis. Thus, the closed-contour formed by the wide arcs is not a circular one but rather of a flower-like type. To the contrary, the closed contour formed by the narrow arcs may be circular.

According to a specific embodiment, the cutting insert can comprise four abutment surfaces extending symmetrically about the insert axis. Such a number of abutment surfaces may be suitable for a cutting insert having four cutting corners, wherein each abutment surface is disposed opposite a cutting corner and being associated with a cutting corner diametrically opposed thereto with respect to the insert axis. The term 'diametrically opposed' should be understood herein to mean that when the cutting insert is secured to the cutting tool holder via an abutment surface, the operational cutting edge is that of a cutting corner located diametrically opposed to the abutment surface.

It is appreciated that an abutment surface can be provided for any of the cutting corners/edges of a cutting insert, wherein a triangular cutting insert having three cutting edges can comprise three abutment surface etc., so that for any number of n cutting corners, the cutting insert will have n abutment surfaces.

The cutting insert can also comprise a chamfer surface extending from at least one of its bottom/top faces, said chamfer surface being conical having its cone base located at said respective bottom/top face and its narrow cone edge disposed remote from the bottom/top face within the insert bore. The diameter of the narrow edge of the chamfer surface can be greater than the diameter of the narrow edge of the abutment surface.

The cutting insert can also comprise one or more intermediate surfaces extending between the narrow edge of the chamfer surface and the wide edge of the abutment surfaces. In addition, narrow edge of the abutment surface can be spaced from the top/bottom face of the cutting insert, giving rise to a second bridging surface defined between the narrow edge and the bottom/top face.

The cutting insert can be reversible, wherein the top and bottom face extend symmetrically about a symmetry plane parallel to both and equally spaced therebetween. Under this arrangement, the cutting insert can comprise two sets of abutment surfaces, each associated with a respective top/bottom face, and wherein the second bridging surface becomes a center surface extending across the symmetry plane between the narrow edges of the abutment surfaces of the first set and the narrow edges of the abutment surfaces of the second set.

Owing to the above configuration in which the abutment surfaces are located within the insert bore, the cutting insert is configured for being fastened by a fastening member having a head portion the diameter of which is smaller than at least the diameter of the inscribing circle of the insert bore at the first bridging surfaces.

The abutment surfaces are designed so as to have a complimentary geometry to that of the fastening member, requiring them to have a corresponding smaller diameter, yielding the reduced curvature radius thereof.

Thus, a surface-to-surface contact is assured between the fastening member and the respective abutment surface of the cutting insert, providing for more robust securing of the cutting insert into the cutting tool holder.

In addition, the above design also yields that the opening of the insert bore is much wider than the opening formed by the abutment surfaces, wherein the opening can accommodate therein a support structure of the cutting tool holder while still providing firm engagement between the fastening member and the much narrower opening formed by the abutment surfaces.

The bore of the cutting insert can be designed without undercuts allowing the cutting insert to be manufactured in a simple pressing process.

In accordance with yet another aspect of the subject matter of the present application there is provided a cutting insert configured for mounting onto a cutting tool holder to form a cutting tool, said cutting insert comprising a top face, a bottom face and an insert bore extending between the top face and the bottom face and having an insert axis, said insert bore having at least one abutment surface configured for coming into contact with a fastening member of the cutting tool holder to be secured to the holder, said abutment surface being outwardly tapered towards the top face and extending between a narrow edge spaced a radial distance r from the insert axis and a wide edge spaced a radial distance $R>r$ from the insert axis, wherein the wide edge is disposed between the narrow edge and the top face, and is located closer to the bottom face than to the top face.

The wide edge can be disposed in close proximity to the narrow edge, and can even be disposed closer to the narrow edge than to the top face of the cutting insert. In addition, the narrow edge can be located at the bottom face.

The abutment surface can be configured for coming into contact with the fastening member when the bottom face of the cutting insert is positioned on a base surface of an insert seat of the cutting tool holder. In other words, the abutment surface is associated with the bottom face of the cutting insert.

In accordance with a specific example, the cutting insert can comprise at least one cutting edge formed at the top face of the cutting insert.

In assembly, the cutting insert is mounted onto the cutting tool holder so that its bottom face is mated against a base surface of the insert seat of the holder. In this position, the at least one abutment surface is located closer to the base surface than to the top face, wherein fastening of the cutting insert into place via contact between the fastening member and the abutment surface also takes place closer to the base surface.

One of the advantages of such an arrangement lies in increasing robustness of fastening as well as allowing the fastening member to protrude less from the insert bore of the cutting tool holder, thereby making it less susceptible to bending.

The cutting insert can comprise two or more cutting edges, and two or more corresponding abutment surfaces configured for engaging the fastening member of the cutting tool holder when the respective cutting edge is in its operational state.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2A is a schematic isometric view of a cutting tool according to another example of the present application;

FIG. 2B is a schematic exploded isometric view of the cutting tool shown in FIG. 2A;

FIG. 2C is a exploded isometric view of the cutting tool holder shown in FIG. 2B;

FIGS. 8A and 8B are schematic cross-section views of another example of a cutting tool of the present application incorporating the cutting insert shown in FIGS. 7A to 7D, shown during a mounting state and a secured state respectively;

FIGS. 8C and 8D are schematic partial top views of the cutting tool shown in FIGS. 8A and 8B;

FIG. 9A is a schematic isometric view of a cutting tool according to another example of the present application;

FIG. 9B is a schematic exploded isometric view of the cutting tool shown in FIG. 9A;

DETAILED DESCRIPTION OF EMBODIMENTS

Figure 1A:
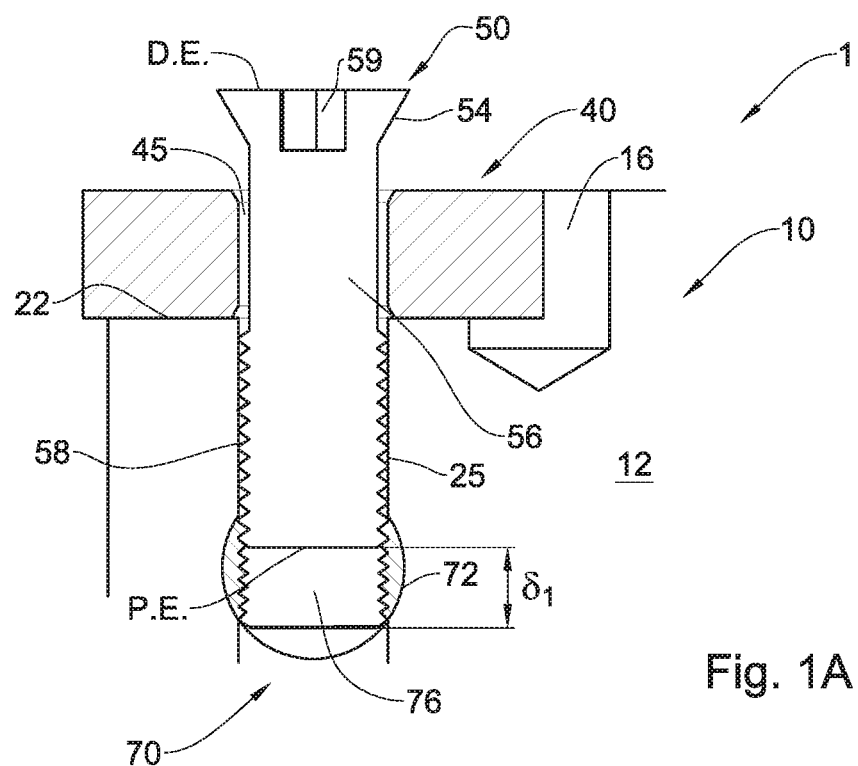
FIG. 1A is a schematic cross-sectional view of a cutting tool according to one example of the present application, show in a mounting state thereof.
Figure 1B:
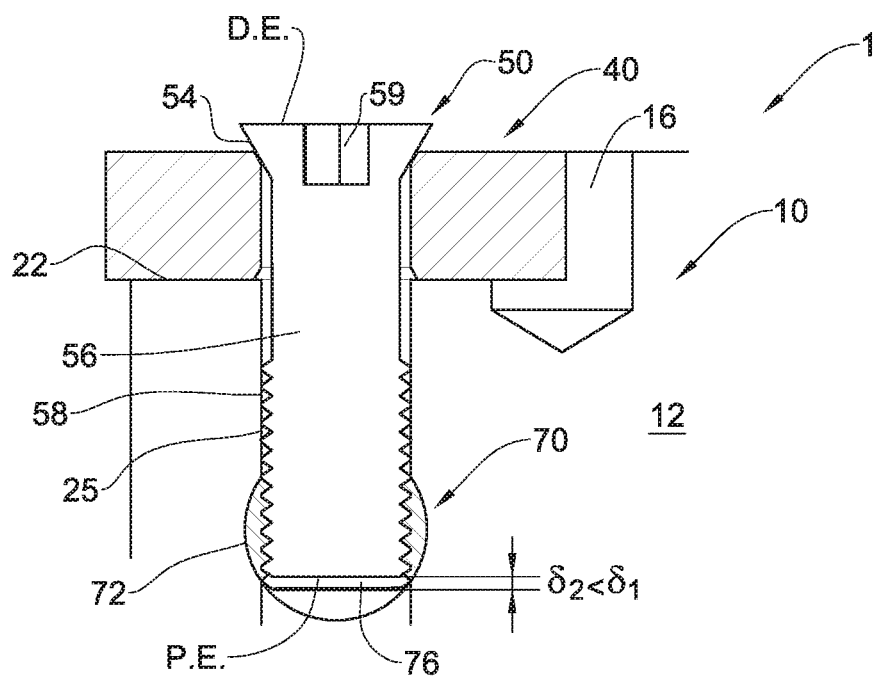
FIG. 1B is a schematic cross-sectional view of a cutting tool according to one example of the present application, show in a secured state thereof.

Attention is first drawn to FIGS. 1A and 1B, in which a cutting tool is shown, generally designated as 1 and comprising a cutting tool holder 10 and a cutting insert 40 mounted thereon using a securing arrangement comprising a fastening member 50 and an anchoring element 70. In all the following figures, where shown in cross-section, the cutting tool holder 10 is shown unhatched.

The cutting tool holder 10 comprises a body 12 formed with an insert seat 20 defined by a base surface 22 and two side surfaces 24 (not shown), forming a corner with a relief bore 16. The insert seat 20 further comprises a seat bore 25 having at open end at the base surface 22, and configured for accommodating therein the fastening member 50.

The cutting insert 40 is respectively formed with an insert bore 45 configured for receiving therethrough the fastening member 50.

The fastening member 50 is in the form of a screw and comprises a shank 52 extending between a proximal end P.E. received within the seat bore 25 and a distal end D.E. projecting from the seat bore 25 and formed with a head portion. The head portion comprises a fastening surface 54 which is inclined with respect to an axis of the fastening member and configured for coming into contact with a respective portion of the cutting insert, at least in the secured state.

The fastening member 50 has also a threaded portion 56 beginning at its proximal end P.E. and configured for engaging and articulating with the anchoring element 70.

The cutting tool holder also comprises an anchoring bore oriented transverse to the seat bore 20 (shown here in its round cross-section), which is configured for accommodating therein an anchoring element 70. The anchoring element comprises a body 72 and a threaded bore 76, configured for engagement and articulation with a proximal end of the fastening member.

As shown in FIG. 1A, the proximal end P.E. of the fastening member 50 is threaded into the anchoring element to a first extent, such that the majority $\delta_1$ of the threaded bore 76 is free of the fastening member 50. In this position, the head portion of the fastening member 50 is not in contact with the cutting insert 40 and so the latter is just loosely positioned within the seat 20.

Turning now to FIG. 1B, when the fastening member is screwed in, it displaces downwards to the position shown in FIG. 1B. In this position, most of the proximal end P.E. of the fastening member 50 is threaded into the anchoring element (to a second extent, greater than the first), such that only a minority $\delta_2$ of the threaded bore 76 is free of the fastening member 50. In this position, the head portion of the fastening member 50 abuts the cutting insert 40 and presses it downwards toward the base surface 22, holding it in place in the secured state.

It is appreciated that in the present example, the purpose of the anchoring element 70 is to replace the thread of the insert bore 25 as common in cutting tool holders. In addition, since the fastening member only performs an axial movement during its displacement between the mounting state and the secured state, and since the head portion performs no lateral movement, no forces are transferred to the anchoring element 70, which remains in essentially the same position and orientation during both states.

Turning now to FIGS. 2A to 2C, another example of a cutting tool is shown, generally designated 101, and comprising a cutting tool holder 110 having an insert seat 120 with a base plate 190 thereon, and a cutting insert 140 mounted onto the base plate of the seat 120 using a securing arrangement (150, 170) comprising a fastening member 150 and an anchoring element 170.

As observed, the insert seat 120 is formed with a support structure 130 projecting above the base surface 122 and the corresponding seat bore 125 formed in the seat 120 (and having an open end at the base surface 122). The support structure 130 comprises a hollow body 132 extending from the base surface 122 and having an inner cavity 135, and which is formed with an extension 134 having an inclined support surface 136 on the inner side of the cavity 135.

In addition, the anchoring element 170 is accommodated within an anchoring bore 114 extending transverse to the seat bore 125, and having two open ends 115a, 115b. The anchoring element 170 also comprises a body 172 formed with a threaded anchoring bore 176 and an access port 178 at one end thereof, which is accessible (in the shown example) via one of the openings 115b.

Figure 3A:
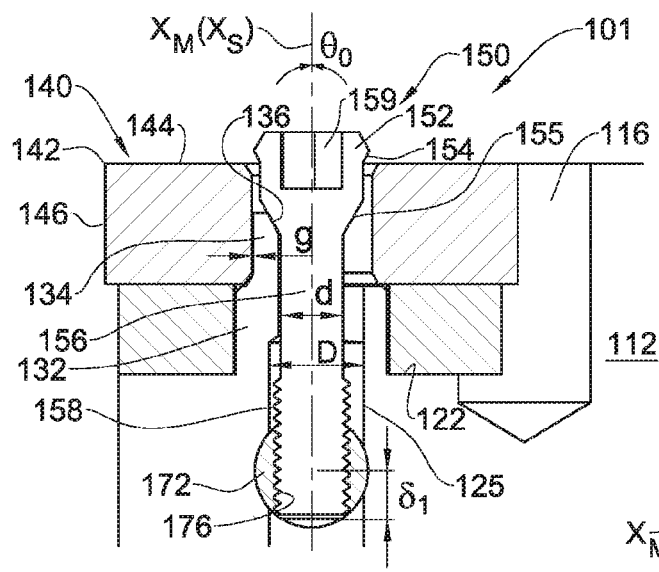
FIGS. 3A to 3C are schematic cross-sectional views of the cutting tool shown in FIGS. 2A and 2B, shown during consecutive stages between a mounting state and a secured state.
Figure 3B:
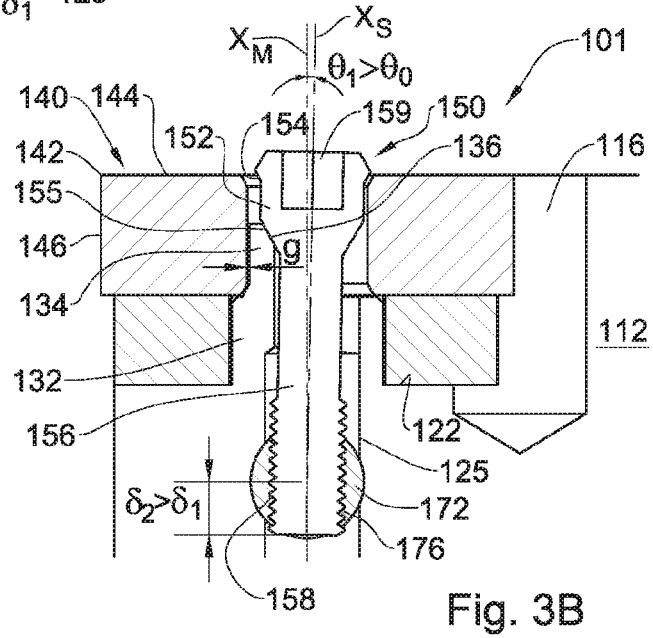
Figure 3C:
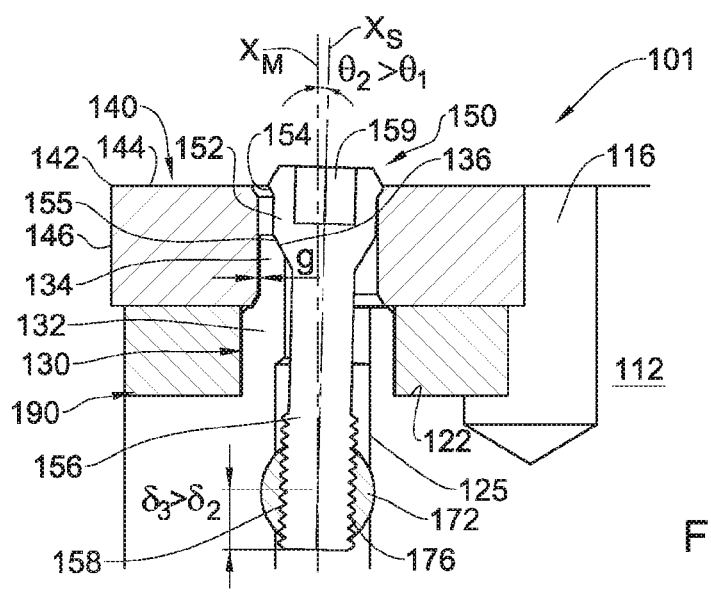
Figure 3D:
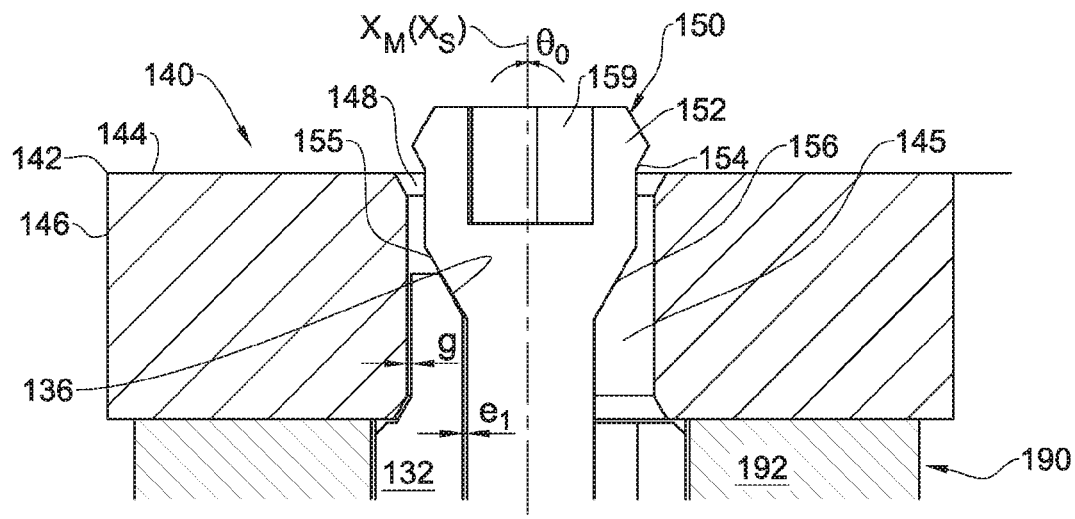
FIGS. 3D to 3F are respective schematic enlarged view of a portion of the cutting tool shown in FIGS. 3A to 3C.

Turning now to FIGS. 3A and 3D, the fastening member 150 comprises a head portion 152 formed with an access port 159 configured for receiving therein a designated tool for operating the fastening member 150. The head portion 152 comprises a fastening surface 154 which is inclined with respect to the axis $X_S$ of the fastening member 150 an configured for abutting a designated portion of the cutting insert 140 at least in the secured position, and an abutment surface 155, also inclined with respect to the axis $X_M$ of the fastening member 150 and configured for abutting a corresponding support surface 136 of the support structure 130.

In assembly, the fastening member 150 is received within the seat bore 125 and the threaded portion 158 at the proximal end thereof is threadingly engaged with the corresponding threaded bore 176 of the anchoring element 170. The proximal end is threaded to an extent $\delta_1$ over the center of the cross-section of the anchoring element 170.

It is observed, in this position, that the diameter d of the fastening member is smaller than the diameter D of the seat bore 125. Specifically, the side of the shank 152 is flush against the left portion of the inner surface of the seat bore 125 (a minimal distance $e_1$), leaving a space between the inner surface of the seat bore 125 and the shank 152 of the fastening member 150 (to the right of the fastening member). This space, as will be explained in detail with respect to FIGS. 3B to 3F, is essential in providing the fastening member 150 with a space to displace in.

Further in assembly, the base plate 190 is mounted over the portion 132 of the support structure so as to rest on the base surface 122 of the insert seat 120. It is noted that the hole in the base plate 190 fits in size and dimension to those of the portion 132.

On top of the base plate 190, the cutting insert 140 is placed. In this connection, the head portion 152 of the fastening member 150 is designed such that the nominal dimension of its largest cross-section is still smaller than that of the insert bore 145, allowing the placement of the cutting insert 140 onto the base plate 190, even when the fastening member 150 is already positioned within the seat bore 125. Specifically, in the position shown in FIG. 3A, the cutting insert 140 is not only placed onto the base plate 190, but is also already placed to assume a location which is essentially similar to the location of the insert 140 in the secured position (although, as shown in FIG. 3A, the cutting insert 140 is not yet secured).

In the position shown in FIGS. 3A and 3D, the insert bore 145 of the cutting insert is configured for accommodating therethrough not only a portion of the fastening member 150, but also for accommodating therein the extension 134 of the support structure 130. It is observed that when mounted onto the extension 134 of the support structure 130, the inner surface of the insert bore 145 does not abut the outer surface of the extension 134, leaving a slight gap g. The importance of the gap will be discussed in detail with respect to FIGS. 3B to 3F.

In operation, starting from the mounting state shown in FIGS. 3A and 3D (or FIG. 4A—the mounting state is a definition based on the position of the fastening member 150, not on that of the cutting insert 140), the fastening member 150 can be revolved (using a designated tool such as a screw-driver) within the seat bore 125. Such revolution, owing to the thread engagement between the fastening member 150 and the anchoring member 170, entails downward axial displacement of the fastening member 150.

Owing to the abutment between the abutment surface 155 and the support surface 136, such downward axial displacement urges the head portion 152 of the fastening member 150 to the right, i.e. towards the side wall of the insert seat 120. However, since the anchoring bore 114 is oriented both transverse to the seat bore 125 and to the direction of this rightward movement of the head portion 152, the anchoring element 170 is urged to perform a rotational movement about its own axis. As a result, the fastening member 150 performs, in addition to its axial downward movement, a pivotal movement with a pivot point at the center of the cross-section of the anchoring element 170, bringing the head portion 152 closer to the side wall 124 of the insert seat 120.

Figure 3E:
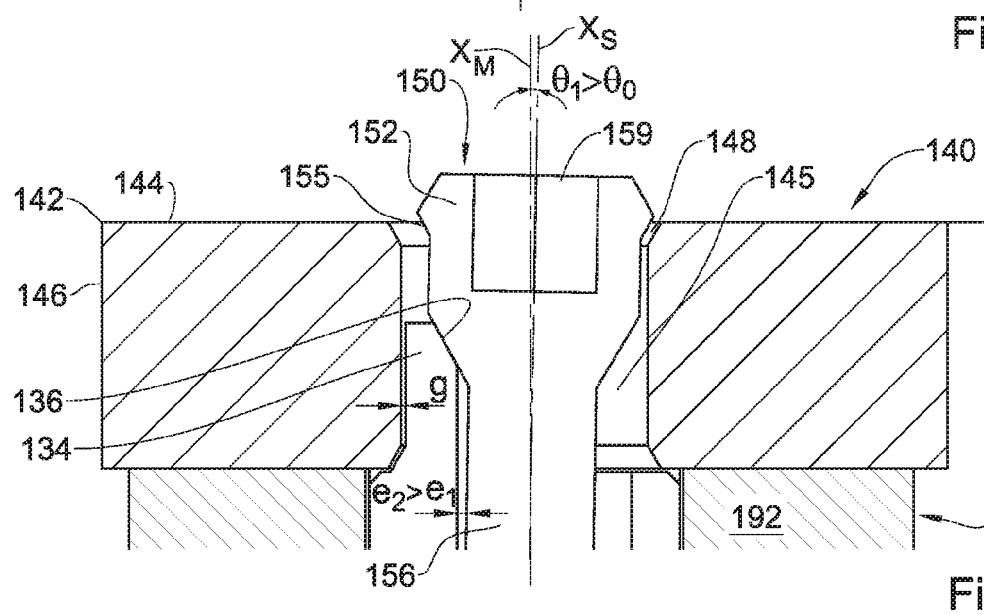

Thus, following such displacement, the position shown in FIGS. 3B and 3E is reached. In this position, it is observed that the fastening member 150 has descended so that the proximal end is threaded to an extent $\delta_2 > \delta_1$ over the center of the cross-section of the anchoring element 170. Additionally, the axis $X_S$ of the fastening member 150 is now tilted at an angle $\theta_1$ with respect to the axis $X_M$ of the seat bore 125 (contrary to the previously shown position in which they were parallel—$\theta_0$), leaving a spacing $e_2 > e_1$ between the left portion of the inner surface of the seat bore 125. Furthermore, due to the combined downward and pivotal movement performed by the fastening member 150, the fastening surface 154 displaces closer to the corresponding chamfer portion 148 of the cutting insert 140.

Figure 3F:
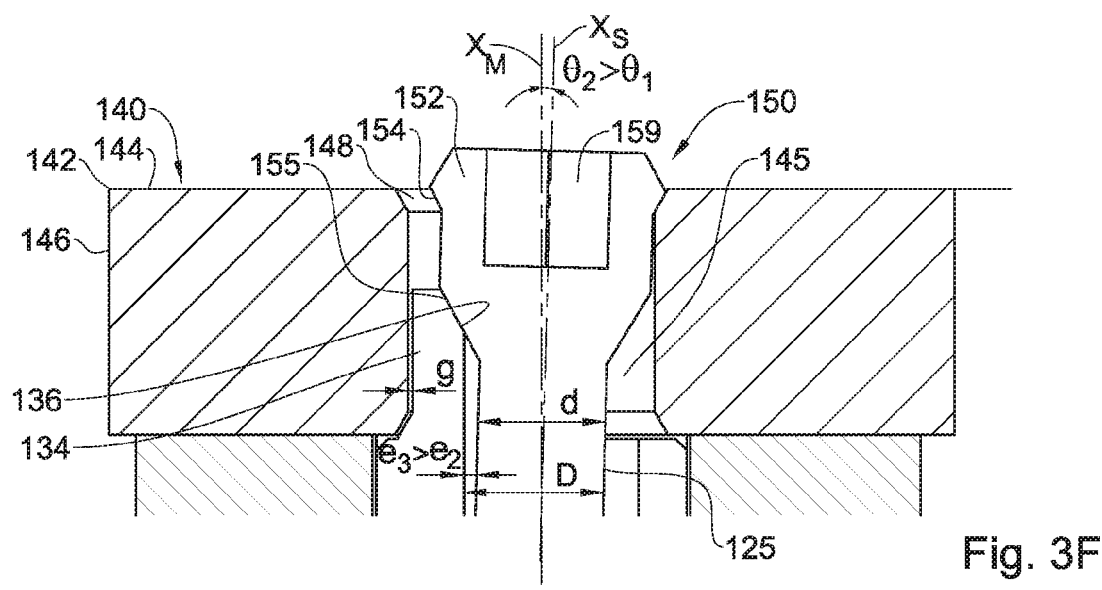

Upon further revolution of the fastening member 150 about its central axis $X_S$, it further displaces downwards, simultaneously with performing its pivot movement until reaching the position shown in FIGS. 3C and 3F.

In this position, it is observed that the fastening member 150 has descended so that the proximal end is threaded to an extent $\delta_2 > \delta_1$ over the center of the cross-section of the anchoring element 170. Additionally, the axis $X_S$ of the fastening member 150 is now tilted at an angle $\theta_2 > \theta_1$ with respect to the axis $X_M$ of the seat bore 125, leaving a spacing $e_3 > e_2$ between the left portion of the inner surface of the seat bore 125. Furthermore, due to the combined downward and pivotal movement performed by the fastening member 150, the fastening surface 154 now abuts the corresponding chamfer portion 148 of the cutting insert 140, to firmly hold the cutting insert 140 in place.

In this secured state shown in FIGS. 3C and 3F, the head portion 152 both presses down on the cutting insert 140 due to its abutment with the chamfer surface 148, and also presses the cutting insert 140 laterally towards the side wall 124. In this position, the distance between the head portion 152 and the side wall 124 is smaller than the dimension of the portion of the cutting insert 140 held therebetween, thus preventing removal of the cutting insert 140 from the cutting tool holder 110.

It is noted that in the secured state, the walls of the cutting insert 140 abut and are pressed against the side walls 124 of the insert seat 120 (see FIG. 5C), still maintaining the gap g between the inner surface of the hole 145 of the cutting insert 140 and the extension 134.

Turning now to FIGS. 4A to 5C, another sequence of mounting and securing the cutting insert 140 is shown, in which, contrary to the sequence shown in FIGS. 3A to 3F, the cutting insert 140 is gradually pushed into place by the fastening member 150.

Figure 4A:
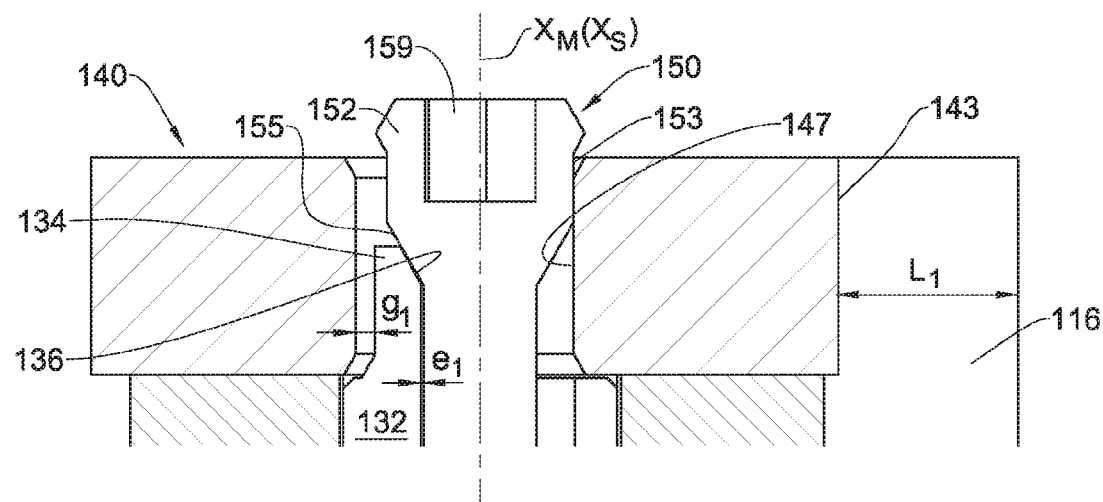
FIGS. 4A to 4C are schematic cross-sectional views of the cutting tool shown in FIGS. 2A and 2B, shown during consecutive stages between a mounting state and a secured state, also demonstrating displacement of the cutting insert thereof.
Figure 4B:
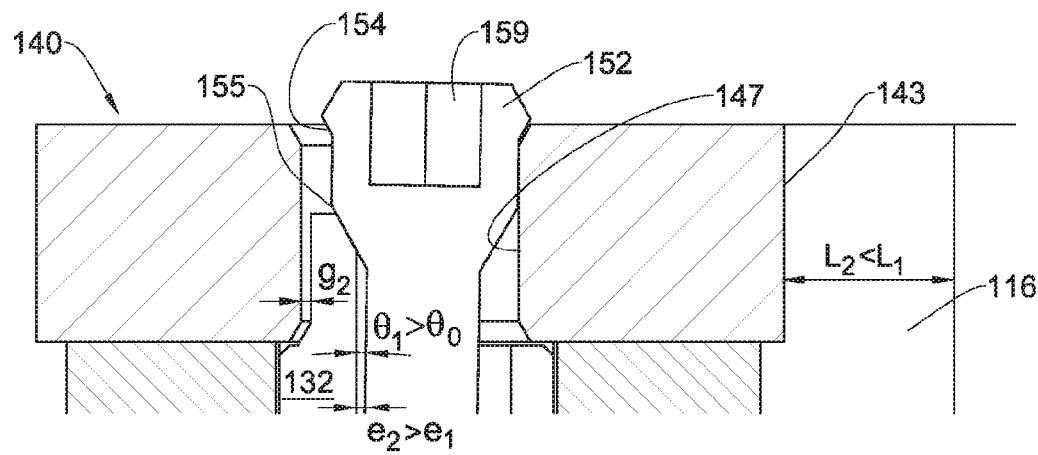
Figure 4C:
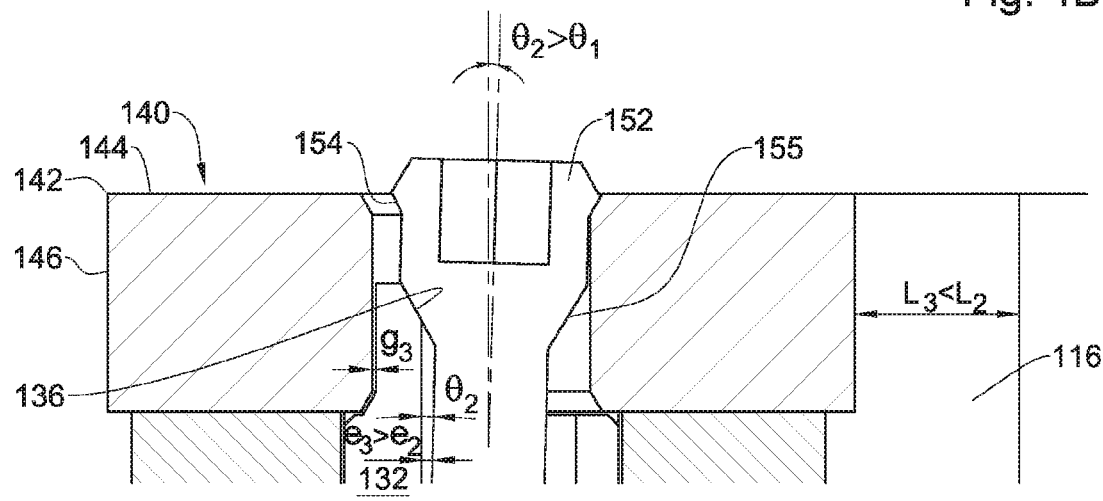
Figure 5A:
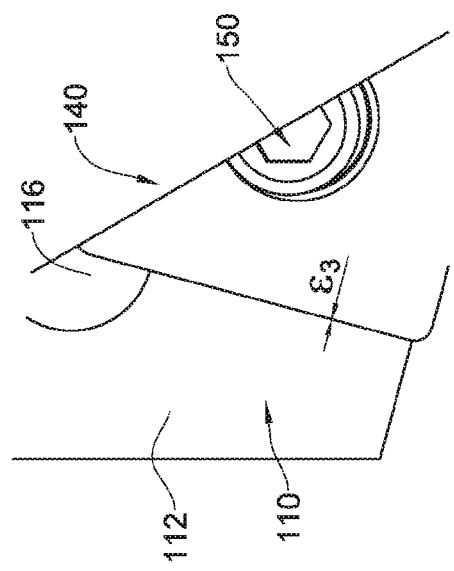
FIGS. 5A to 5C, are schematic partial top views of the consecutive stages shown in FIGS. 4A to 4C.
Figure 5B:
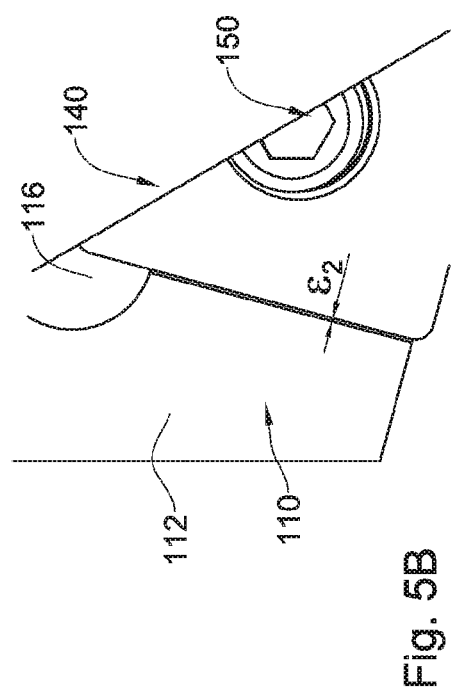
Figure 5C:
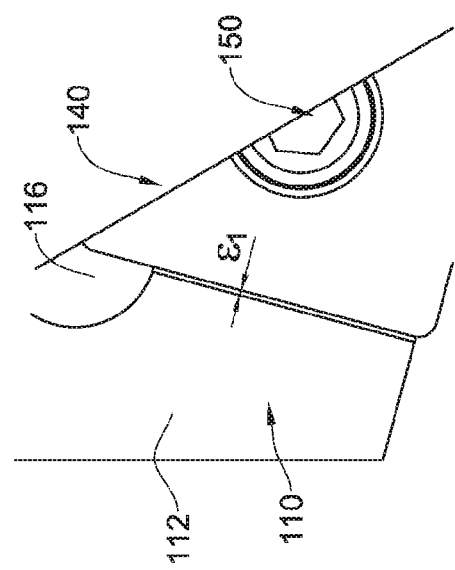

In particular, in the position shown in FIGS. 4A and 5A, the cutting insert 140 is mounted over the head portion 152 of the fastening member 150 to be placed flush onto the base plate 190, but its lateral position is not the same as in its secured state (FIG. 4C). Specifically, the chamfer portion 148 of the cutting insert 140 abuts the outer surface 153 of the head portion 152 of the fastening member 150, the distance between the cutting insert 140 and the side wall is $\varepsilon_1$ and the distance between the cutting insert 140 and the corner 116 of the insert seat 120 is $L_1$.

Upon downward displacement of the fastening member 150 into the seat bore 125, owing to the above abutment with surface 153, the pivotal movement of the head portion 152 pushes the cutting insert 140 towards the corner 116, to the position shown in FIG. 4B. In this position, the distance between the cutting insert 140 and the side wall is $\varepsilon_2 < \varepsilon_1$ and the distance between the cutting insert 140 and the corner 116 of the insert seat 120 is $L_2 < L_1$.

Further screwing of the fastening member 150 and consequent downwards movement thereof entails further pushing of the cutting insert 140 to the position shown in FIG. 4C, which is essentially similar to that shown in FIGS. 3C and 3F. In this position, the fastening surface 154 firmly abuts the chamfer portion 148, the distance between the cutting insert 140 and the side wall is $\varepsilon_3 < \varepsilon_2$ and the distance between the cutting insert 140 and the corner 116 of the insert seat 120 is L3<L2.

Figure 6B:
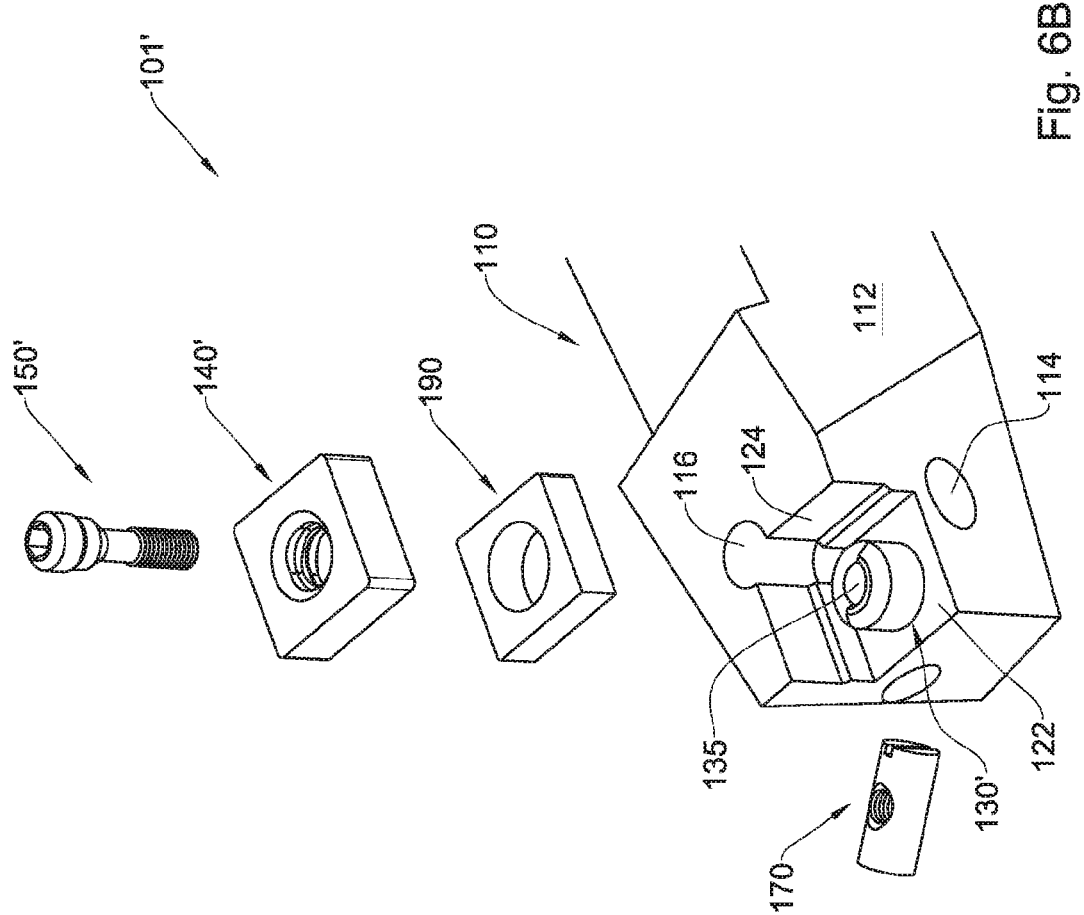
FIG. 6B is a schematic exploded isometric view of the cutting tool shown in FIG. 6A.
Figure 6A:
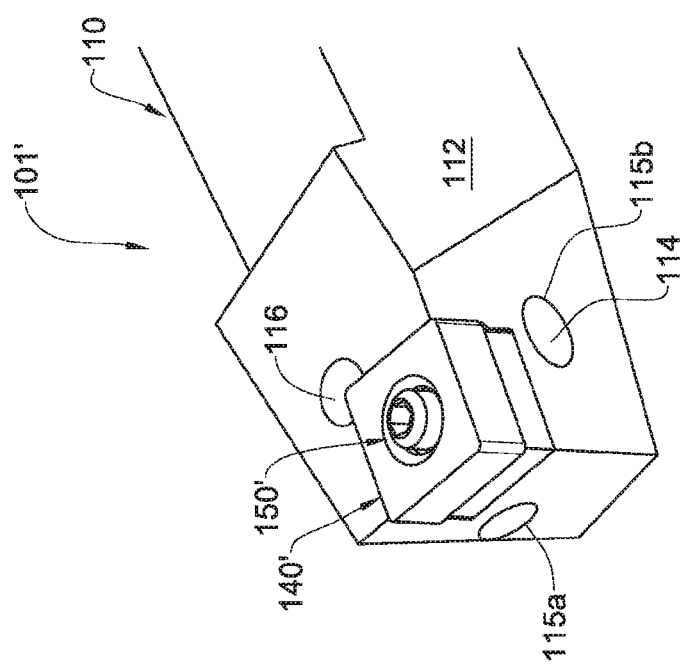
FIG. 6A is a schematic isometric view of a cutting tool according to another example of the present application.
Figure 7B:
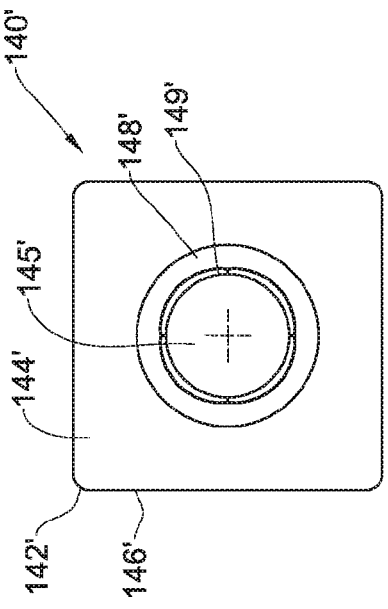
FIGS. 7A to 7D are respective schematic isometric, top, cross-section and enlarged views of a cutting insert used in the cutting tool shown in FIGS. 6A and 6B.
Figure 7A:
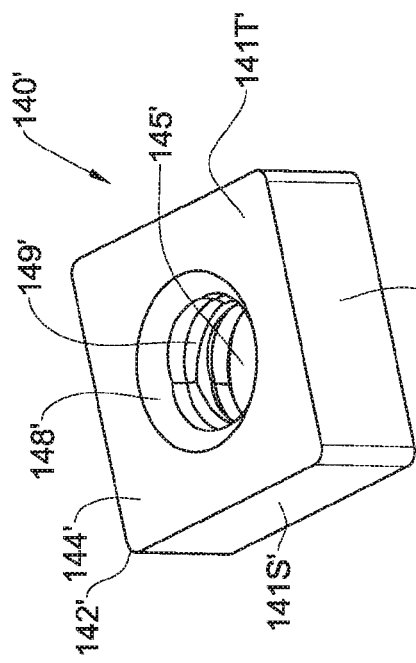
Figure 7D:
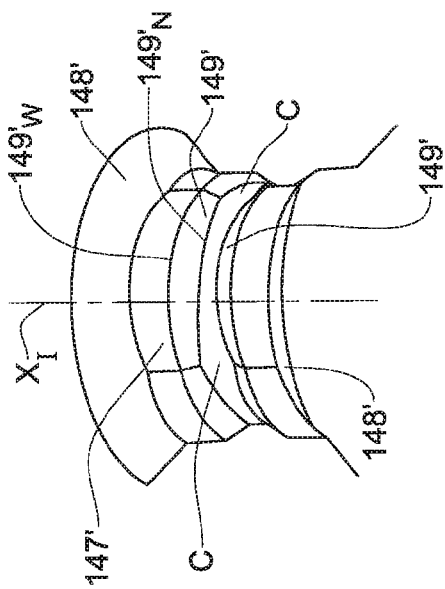
Figure 7C:
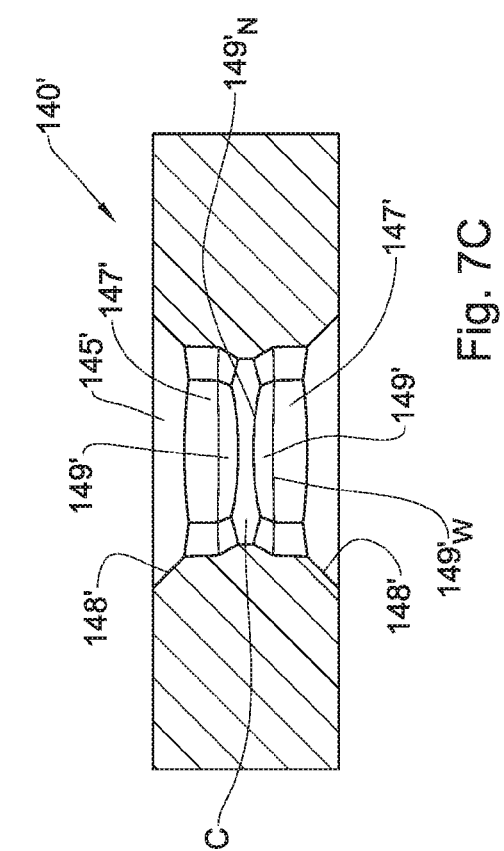

Attention is now drawn to FIGS. 6A and 6B, in which yet another cutting tool is shown, generally designated as 101', and comprising a cutting tool holder 110' having an insert seat 120' with a base plate 190 thereon, and a cutting insert 140' mounted onto the base plate of the seat 120' using a securing arrangement comprising a fastening member 150' and an anchoring element 170'.

Turning now to FIGS. 7A to 7D, the cutting insert 140' comprises a body defined by a top face 141T', a bottom face 141B' and side walls 141S' extending therebetween. The cutting insert 140' is reversible, and is thus symmetrical about a plane (not shown) extending parallel to the top/bottom face and located therebetween. Only one half of the cutting insert 140' will now be described, noting that the opposite half is completely symmetrical.

The cutting insert comprises an insert bore 145' constituted by several designated surfaces: a chamfer surface 148', extending from the top face 141T', four intermediate surfaces 147' extending from the chamfer surface 148' parallel to the axis of the insert bore 145', four abutment surfaces 149' each extending from a respective intermediate surface 147' and oriented at an angle to the axis of the insert bore 145', and a central surface C extending from the respective abutments surfaces 149' parallel to the axis of the insert bore 145', and across the symmetry plane.

It is noted that each of the four abutment surfaces 149' has a smaller curvature radius than that of the chamfer surface 148', whereby together they form a flower-type opening rather than a completely circular one (as of the chamfer surface 148').

Specifically, each of the abutment surfaces 149' is constituted by a conical surface extending between a narrow edge $149_N'$ with a first radius of curvature r and a wide edge $149_W'$, with a second radius of curvature R>r. The arrangement is such that the narrow edges $149_N'$ of the abutment surfaces 149' form together a complete circular contour. In contrast, the second radius of curvature R is smaller than the radius of curvature R' of the inscribing circle (not shown) of the wide edges 149W' of the abutment surfaces 149', so that the centers of curvature of the wide edges $149_W'$ do not coincide with the center O of the cutting insert 140. As a result, the wide edges $149_W'$ form together a flower-like contour rather than a circular one (see FIG. 7B). This arrangement provides for better abutment with the fastening member 150 as will be explained in detail with respect to FIGS. 8A to 8D.

A similar arrangement is provided for the intermediate surfaces 147', whereas the central surface C (at least in this particular example) is completely circular, similar to the chamfer surface 148'.

The cavity 145' of the cutting insert 140' is such that the cutting insert 140' can be easily manufactured in a pressing process, in the sense that it does not comprise undercuts or geometry which would make it difficult to manufacture in such a process.

With additional reference being made to FIGS. 8A to 8D, a cutting tool is shown, generally designated 101', and comprising a cutting tool holder 110' with a support structure 130', a base plate 190', and the cutting insert 140' mounted thereon using a securing arrangement comprising a fastening member 150' and the anchoring element 170 as used in the previous example.

The fastening member 150' is of a similar design to fastening member 150, albeit slightly differing complementary to the design of the inner surface of the insert bore 145'. The fastening member 150' comprises a head portion 152' with an access port 159', and is formed with a fastening surface 154' extending below the head portion 152' thereof and configured for abutting the cutting insert 140', and an abutment surface 155' configured for coming into contact with an abutment surface 136' of the support structure 130'.

In assembly, the base plate 190' is mounted over the base 132' of the support structure 130', leaving an extension 134' protruding from the base plate 190'. The fastening member 150' is received within the seat bore 125' and has its proximal end articulated to the anchoring element 170 (not shown—articulation is similar to that described with respect to FIGS. 2A to 5C). The cutting insert 140' is mounted over the head portion 152' of the fastening member 150', such that the insert bore 145' thereof receives therein the extension 134', the chamfer surface 148' residing over it at a gap distance g.

In the position shown in FIG. 8A, the cutting insert 140' is not in its secured position and the central surface C thereof abuts the head portion 152' of the fastening member 150'. The cutting insert 140' is spaced at a distance $l_1$ from the corner 116' of the cutting tool holder 110', and at a distance $\varepsilon_1$ from the side walls 124' of the insert seat 120'.

With further reference being made to FIGS. 8C and 8D, upon rotation of the fastening member about its axis, as previously described with respect to FIGS. 2A to 5C, the fastening member performs a downward displacement wherein the abutment between the surface 155' thereof and the support surface 136' causes a pivotal motion of the fastening member 150' about the center of the anchoring element's cross-section.

Upon sufficient such displacement, the fastening surface 154' to be urged closer towards a respective of the four abutment surfaces 149' of the cutting insert 140' to properly clamp it against both the side wall 124' and the base plate 190, as shown in FIG. 8B. In this position, the distance between the cutting insert 140' and the corner 116' is now $l_2<l_1$, and the walls of the cutting insert 140' are flat against the side walls 124' of the insert seat 120', i.e. $\varepsilon_2=0<\varepsilon_1$.

In addition, it is noted that, as in previous examples, conical dimensions of the fastening surface 154' of the fastening member 150' is smaller than that of the bore 145' of the cutting insert 140, i.e. the fastening member has, in a cross-section perpendicular to the axis of the insert bore 145', a smaller radius of curvature r' than that of the respective inscribing circle of the insert bore 145' at that cross-section. However, reverting back to FIGS. 7A to 7D, since the abutment surfaces 149' also have a radius of curvature r smaller than that of the inscribing circle of the bore 145', this yields a surface-to-surface match between the fastening surface 154' and the respective of the abutment surfaces 149' of the cutting insert 140' with which it comes into contact.

It is important to note that were the abutment surfaces 149' of the cutting insert 140' of a larger radius of curvature than that of the fastening surface 154', it would yield a point-to-point contact between the latter and the former, rather than a surface-to-surface contact. The given configuration of the abutment surfaces 149' provides a more secure and firm engagement of the surfaces 154', 149', at a location of the insert bore 145' opposite the working corner 142' of the cutting insert 140'.

The sequence shown here is similar, in essence, to that described with respect to FIGS. 4A to 5C, in which displacement of the fastening member is the one responsible for bringing the cutting insert 140' to its proper secured position.

It is also appreciated that in the described example of FIGS. 8A to 8D, the cavity 145' of the cutting insert 140' is larger at the ends thereof so as to be wide enough to accommodate the extension 134' of the support structure 130' therein, whereas the inner diameter of the cavity 145' is smaller, in order to properly interact with the head portion 152' of the fastening member.

Attention is now drawn to FIGS. 9A and 9B, in which yet another example of a cutting tool is shown, generally designated as 201. The cutting tool 201 comprises a cutting tool holder 210 which has an insert seat 220 formed with a support structure 230, a base plate 290, a cutting inset 240 mounted onto the cutting tool holder 210 and secured in place by a securing arrangement comprising a fastening member 250 and a spring biased anchoring element 270.

Contrary to the previously described examples, in the present example the anchoring bore 214 extends transverse to the axis of the seat bore 225 but along the direction of movement of the fastening member 250, i.e. extending towards the corner 216 of the insert seat 220.

Figure 10A:
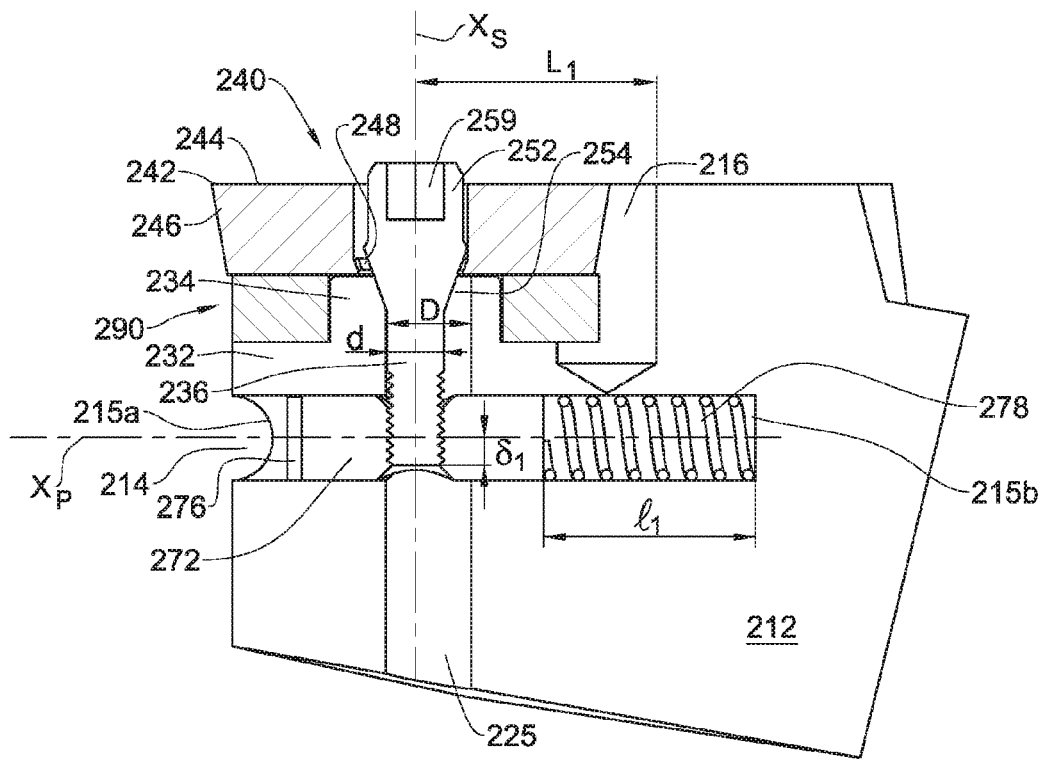
FIGS. 10A and 10B are schematic cross-section views of another example of a cutting tool of the present application, shown during a mounting state and a secured state respectively.

With additional reference being made to FIG. 10A, in assembly, the base plate 290 is mounted over the base 232 of the support structure 230, and the fastening member 250 is received within the insert bore 225, with its proximal end threaded into the anchoring element 270, and the distal end thereof projecting from the base place 290. The dimension D of the bore 225 is greater than the diameter d of the shank 256 of the fastening member 250, allowing it sufficient displacement space. The cutting insert 240 is mounted over the head 252 of the fastening member 250, and is shown in its mounting position, spaced at a distance L1 from the corner 216.

Upon revolution of the fastening member 250, it performs a downward axial movement owing to is screwing engagement with the anchoring element 270. During this movement, owing to the abutment between the abutment surface 254 and the support surface 236, the downward displacement urges the head portion 252 to displace rightward towards the corner 216 of the cutting tool holder 210.

Contrary to the previous examples shown in FIGS. 2A to 8D, in the present example, owing to the orientation of the anchoring bore 214, such rightward lateral displacement of the head portion 252 entails axial displacement of the anchoring element 270 in the same direction (contrary to a rotary movement as in the previous examples).

Figure 10B:
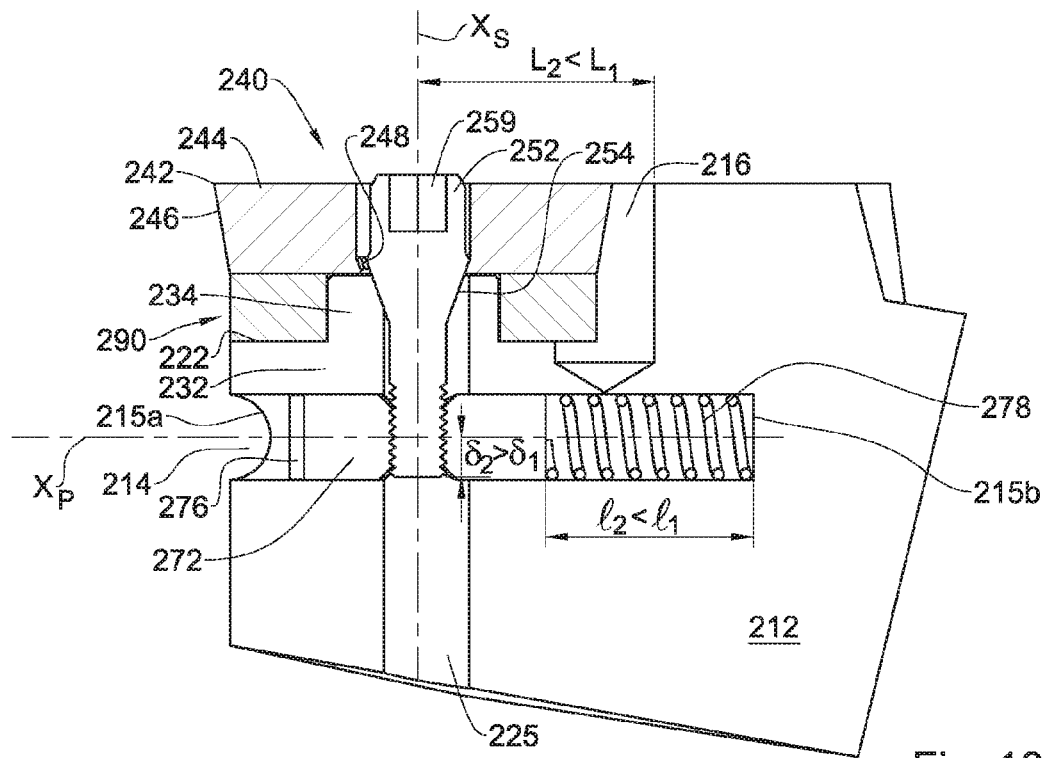
Figure 10C:
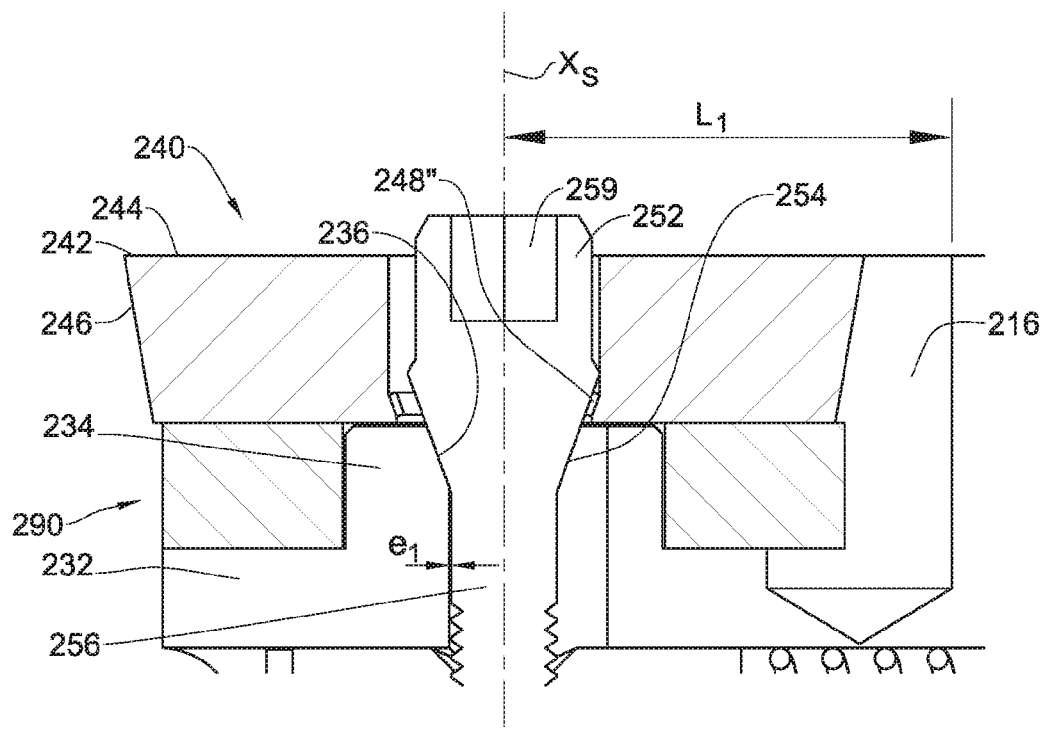
FIGS. 10C and 10D are respective schematic enlarged view of a portion of the cutting tool shown in FIGS. 10A and 10B.
Figure 10D:
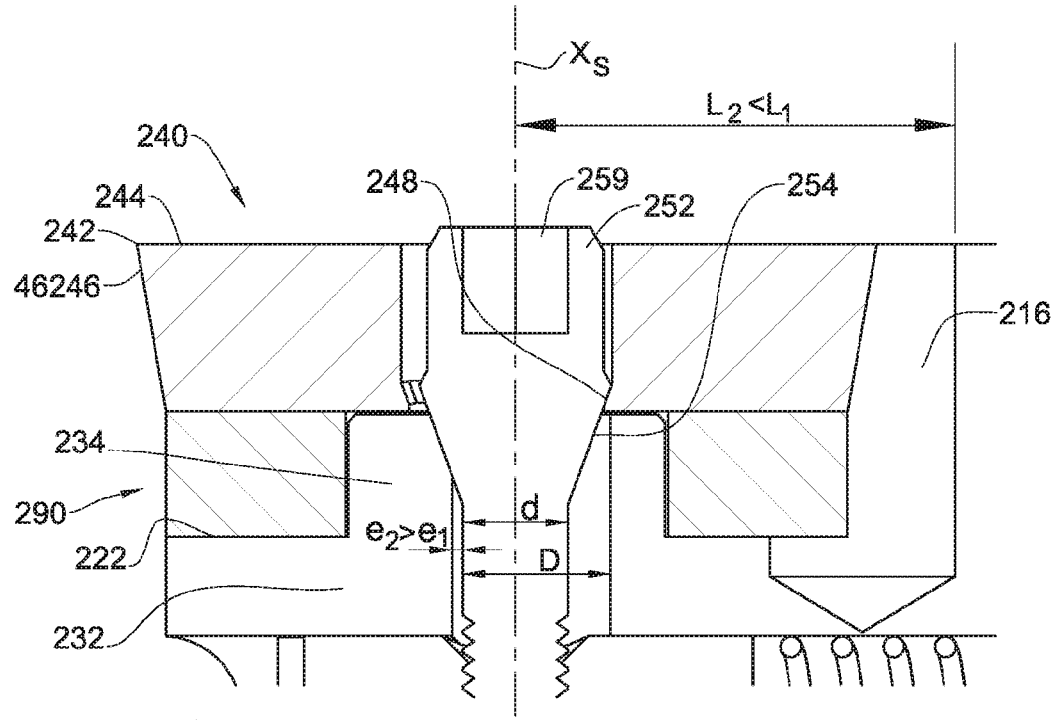

Thus, with additional reference to FIGS. 10B to 10C, upon such downward displacement of the fastening member 250 and simultaneous rightward traveling thereof, the anchoring element 270 also displaces to the position shown in FIGS. 10B and 10D.

In the position shown in FIGS. 10B and 10D:
 the cutting insert 240 is spaced a distance L2<L1 from the corner 216;
 the proximal end of the fastening member is threaded to an extent $\delta_2>\delta_1$ over the center of the cross-section of the anchoring element;
 the fastening member 250 is spaced a distance $e_2>e_1$ from the left side portion of the inner surface of the seat bore 225; and
 the anchoring element 270 is spaced a distance $l_2<l_1$ from the closed end of the anchoring bore 214.

It is appreciated that in the given example, the insert bore 245 of the cutting insert 240 does not accommodate therein any portion of the support structure 230. It is also appreciated that the fastening member 250 comprises a surface 254 which serves both as the abutment surface which is mated against the support surface 236 of the support structure 230 and as the fastening surface abutting the cutting insert 240.

In the present example, the spring 278 is configured for returning the anchoring 270 element back to its original position when the cutting insert 240 is removed from the cutting tool holder 210.

Figure 11A:
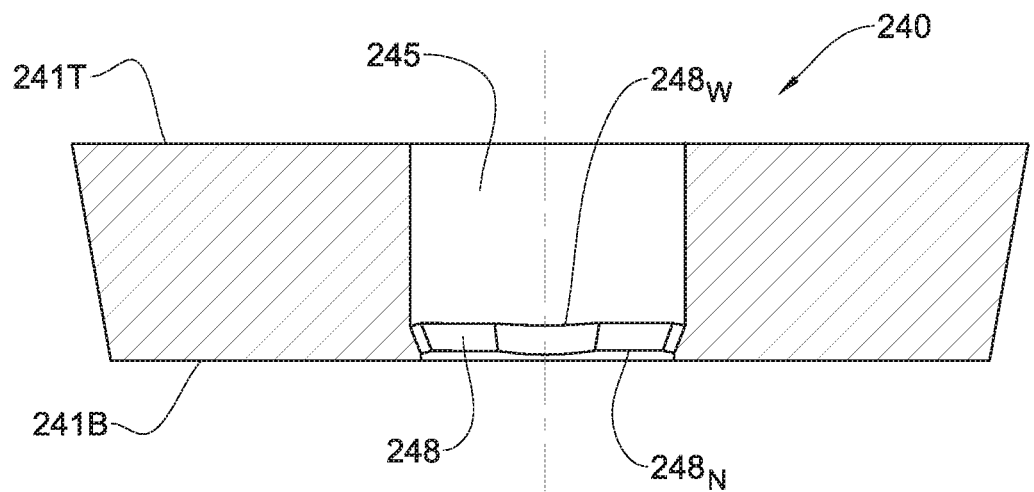
FIGS. 11A and 11B are schematic isometric and front cross-section views of a cutting insert used in the cutting tool shown in FIGS. 9A to 10D.
Figure 11B:
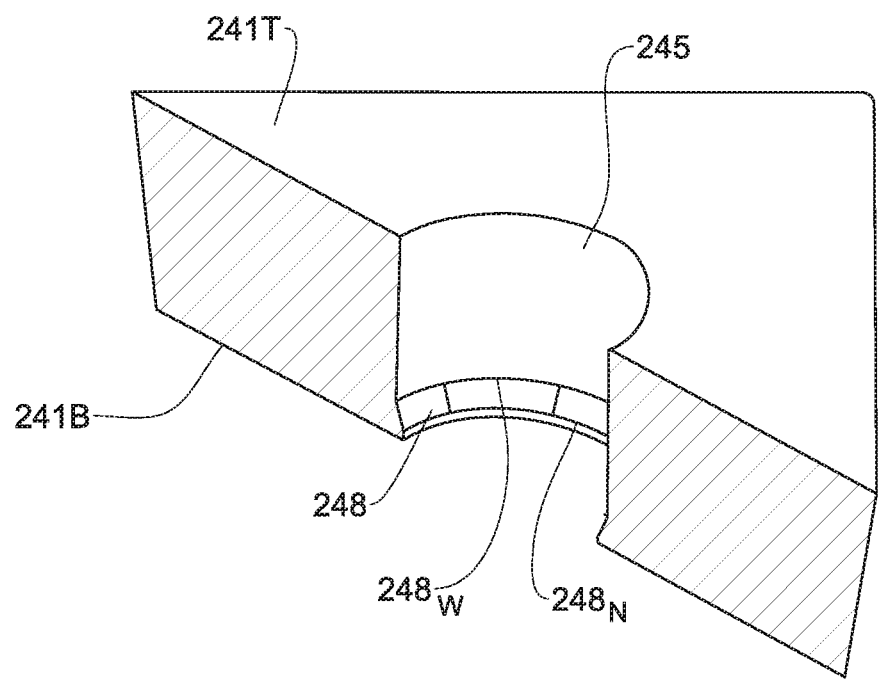

Finally, attention is drawn to FIGS. 11A and 11B, in which the cutting insert 240 is shown in detail. The cutting insert had a top face 241T and a bottom face 241B, and the insert bore 245 is formed with a plurality of abutment surfaces 248. Each of the abutment surfaces 248 is constituted by a conical surface tapering outwards towards the top face 241T, and has a narrow edge $248_N$ and a wide edge $248_W$.

It is observed that the abutment surface 248 is disposed much closer to the bottom face 241B of the cutting insert 240 than to the top face 241T. More specifically, it is noted that the wide edge $248_W$ of the abutment surface 248 is disposed between the narrow edge $248_N$ and the top surface 241T, and is also much closer to the bottom face 241B than to the top face 241T. This is opposed to standard cutting inserts in which the conical surface configured for coming into contact with the fastening screw is constituted by a chamfer surface of the cutting insert and is usually disposed closer to the top face of the cutting insert.

The above arrangement allows the fastening surface 254 of the fastening member 250 to secure the cutting insert 240 into place at a much 'lower' location, i.e. at a portion of the cutting insert 240 which is closer to the base surface 222. This, in turn, provides for a more robust securing of the cutting insert 240 into the insert seat 220.

In particular, since the fastening of the cutting insert 240 is performed via an abutment surface 248 which is associated with a bottom face 241B of the cutting insert 240, this also yields that the head portion of the fastening member 250 minimally protrudes into the insert seat 220 from the insert bore 225. Thus, a smaller (shorter) portion of the fastening member 250 extends outside the seat bore 225, thereby reducing the fastening member's 250 susceptibility to bending forces which may take place during fastening.

Those skilled in the art to which this invention pertains will readily appreciate that numerous changes, variations, and modifications can be made without departing from the scope of the invention, mutatis mutandis.

The invention claimed is:

1. A cutting tool holder configured for mounting thereon a cutting insert, said cutting tool holder comprising:
   a body formed with an insert seat configured for receiving therein the cutting insert and comprising a side wall; and
   a seat bore comprising a corresponding support portion of the seat bore, located opposite the side wall of the seat, the seat bore configured for accommodating therein a fastening member including a head portion configured for abutting the support portion;
   wherein said cutting tool holder includes an anchoring element received within the body of the holder, said fastening member being configured for secured engagement with said anchoring element and being free of such engagement with the seat bore, the fastening member being configured for axial displacement along the seat bore and with respect to the anchoring element.

2. The cutting tool holder according to claim 1, further comprising:
   wherein the body includes a base surface;
   wherein the seat bore extends within the body along a bore axis, and having an open end at said base surface;
   an anchoring bore extends within the body along an anchoring axis oriented transverse to said bore axis, and intersecting with said seat bore to have a mutual intersection zone;
   a securing arrangement including:
      the fastening member having a proximal end and a distal end and configured for being received within the seat bore in a disengaged manner, said distal end being configured for securing the cutting insert into said insert seat;
      the anchoring element received within said anchoring bore and configured for being articulated to the proximal end of said fastening member at the mutual intersection zone, when the latter is received within said seat bore;
      wherein articulation between the fastening member and the anchoring element allows the fastening member to freely displace within said seat bore into a secured state in which the distal end secures said cutting insert into the insert seat.

3. The cutting tool holder according to claim 2, wherein the anchoring bore has at least one open end and a position and/or an orientation of the anchoring element with respect to the anchoring bore can be adjusted via said open end using a designated tool.

4. The cutting tool holder according to claim 2, wherein the distal end of the fastening member includes a head portion configured for engaging a designated portion of the cutting insert, a designated portion of the cutting tool holder or both to provide proper securing of the cutting insert into the insert seat in the secured state.

5. The cutting tool holder according to claim 2, wherein:
   displacement of the fastening member within the seat bore is axial; and
   the anchoring element is configured for maintaining a substantially fixed orientation within the anchoring bore during displacement of the fastening member.

6. The cutting tool holder according to claim 2, wherein the fastening member is configured for displacing with respect to the seat bore between a mounting state in which the distal end of the fastening member protrudes from the base surface to a first axial extent and is disposed at a first gap distance from the side wall, and a secured state in which said distal end protrudes from said base surface to a second axial extent, different than the first axial extent and is disposed at a second gap distance from the side wall, smaller than the first gap distance, so as to engage the cutting insert, thereby securing a portion thereof between a head portion of the fastening member and the side wall.

7. The cutting tool holder according to claim 6, wherein axial displacement of the fastening member between the mounting state and the secured state entails a respective displacement of the anchoring element, so that in the mounting state said anchoring element is in a first anchoring position with respect to said anchoring bore, and in said secured state, said anchoring element is in a second anchoring position with respect to said anchoring bore, different than the first anchoring position.

8. The cutting tool holder according to claim 6, wherein in the mounting state the first gap distance is such that allows said cutting insert to be placed onto the seat and/or being fully removed from the seat over the head portion of the fastening member.

9. The cutting tool holder according to claim 1, wherein the anchoring element is separate and detachable from the body of the cutting tool holder.

10. The cutting tool holder according to claim 1, wherein the fastening member includes a body that is configured for freely displacing within said seat bore without engaging the seat bore.

11. The cutting tool holder according to claim 1, wherein the fastening member is received within the seat bore in a loosely displaceable manner, thereby allowing lateral displacement thereof with respect to the seat bore in a direction transverse to a bore axis of the seat bore.

12. The cutting tool holder according to claim 1, wherein the fastening member is configured for assuming a mounting state within said seat bore in which a cutting insert can be placed in the insert seat, and a secured state in which the cutting insert is secured within the seat.

13. The cutting tool holder according to claim 1, wherein the fastening member is configured to be displaced within the seat bore either laterally or pivotally.

14. The cutting tool holder according to claim 13, wherein:
   the fastening member includes a head portion that is asymmetrically shaped around an axis of the fastening member; and
   the support portion is adjacent said head portion.

15. The cutting tool holder according to claim 14, wherein revolution of the fastening member about an axis thereof entails lateral displacement of the head portion of the fastening member towards the side wall as a result of its engagement with the support portion.

16. The cutting tool holder according to claim 14, further comprising an anchoring bore extending within the body along an anchoring axis oriented transverse to a bore axis of the seat bore, the anchoring bore intersecting with said seat bore to have a mutual intersection zone, the anchoring bore oriented transverse to both the seat bore and a movement direction of the head portion of the fastening member, whereby displacement of the head portion towards the side wall entails revolution of the anchoring element within the anchoring bore about the anchoring bore's axis.

17. The cutting tool holder according to claim 14, further comprising an anchoring bore extending within the body along an anchoring axis oriented transverse to a bore axis of the seat bore, the anchoring bore intersecting with said seat bore to have a mutual intersection zone, the anchoring bore is oriented transverse to the seat bore and along a movement direction of the head portion of the fastening member, whereby displacement of the head portion towards the side wall entails axial displacement of the anchoring element within the anchoring bore along the anchoring axis.

18. The cutting tool holder according to claim 1, wherein the anchoring bore is oriented transverse to the seat bore and along a movement direction of the head portion of the fastening member, whereby displacement of the head portion towards the side wall entails axial displacement of the anchoring element within the anchoring bore along the anchoring bore's axis.

* * * * *